(12) United States Patent
Segal

(10) Patent No.: US 9,363,448 B2
(45) Date of Patent: *Jun. 7, 2016

(54) SYSTEM AND METHOD FOR PROVIDING AND INTERACTING WITH COORDINATED PRESENTATIONS

(71) Applicant: Touchcast, LLC, New York, NY (US)

(72) Inventor: Edo Segal, New York, NY (US)

(73) Assignee: TOUCHCAST, LLC, New York, NY (US)

( * ) Notice: Subject to any disclaimer, the term of this patent is extended or adjusted under 35 U.S.C. 154(b) by 148 days.

This patent is subject to a terminal disclaimer.

(21) Appl. No.: 14/316,536

(22) Filed: Jun. 26, 2014

(65) Prior Publication Data

US 2014/0321834 A1    Oct. 30, 2014

Related U.S. Application Data

(63) Continuation-in-part of application No. 13/938,955, filed on Jul. 10, 2013, now Pat. No. 9,036,043, which is a continuation of application No. 13/152,063, filed on Jun. 2, 2011, now Pat. No. 8,508,614.

(60) Provisional application No. 61/839,757, filed on Jun. 26, 2013, provisional application No. 61/845,743, filed on Jul. 12, 2013.

(51) Int. Cl.
*H04N 5/228* (2006.01)
*H04N 5/265* (2006.01)
*H04N 5/222* (2006.01)
*G11B 27/031* (2006.01)

(52) U.S. Cl.
CPC ............. *H04N 5/265* (2013.01); *G11B 27/031* (2013.01); *H04N 5/2222* (2013.01)

(58) Field of Classification Search
None
See application file for complete search history.

(56) References Cited

U.S. PATENT DOCUMENTS

| 8,745,657 B2 | 6/2014 | Chalozin et al. |
| 9,036,043 B2 * | 5/2015 | Segal .................. H04N 5/2222 348/222.1 |
| 2002/0186233 A1 | 12/2002 | Holtz et al. |
| 2008/0096175 A1 | 4/2008 | Du Toit et al. |
| 2008/0150913 A1 | 6/2008 | Bell et al. |
| 2009/0153804 A1 | 6/2009 | Giraldo et al. |
| 2009/0237565 A1 | 9/2009 | Staker et al. |
| 2010/0174783 A1 | 7/2010 | Zarom |
| 2011/0202827 A1 * | 8/2011 | Freishtat ................ G06Q 30/02 715/234 |
| 2011/0298935 A1 | 12/2011 | Segal |
| 2013/0073985 A1 | 3/2013 | Hamlin et al. |
| 2014/0002581 A1 | 1/2014 | Bear et al. |
| 2014/0132702 A1 | 5/2014 | Leibovich et al. |

* cited by examiner

*Primary Examiner* — Eileen Adams
(74) *Attorney, Agent, or Firm* — Leason Ellis LLP

(57) ABSTRACT

Disclosed is system and method to generate coordinated presentation, and that includes: a curating content module to curate content selected by a user for inclusion in the coordinated presentation; an audio/visual input module to capture, at least via a camera, a plurality of images for inclusion in the coordinated presentation; a display module to display, via a display coupled to the computing device, a first arrangement of all of the curated content. Moreover, a user interface module can be provided that comprises a touch-screen interface to enable user-based selection and manipulation of a portion of the curated content and a video mixer module to integrate the plurality of images captured by the camera together with a portion of the curated content via a user selection from the touch-screen interface. The coordinated presentation is configured to enable respective interaction with the portion of the curated content at each of the remote devices.

20 Claims, 23 Drawing Sheets

_US 9,363,448 B2_

SYSTEM AND METHOD FOR PROVIDING AND INTERACTING WITH COORDINATED PRESENTATIONS

CROSS-REFERENCE TO RELATED APPLICATION

The present application is a continuation-in-part of U.S. Non-Provisional patent application Ser. No. 13/938,955, filed Jul. 10, 2013, which is a continuation of U.S. Non-Provisional application Ser. No. 13/152,063, filed Jun. 2, 2011, now U.S. Pat. No. 8,508,614, issued Aug. 13, 2013. The present application further claims priority to U.S. Provisional Patent Application No. 61/839,757, filed Jun. 26, 2013, and to U.S. Provisional Patent Application No. 61/845,743, filed Jul. 12, 2013. Each of the above applications is hereby incorporated by reference as if expressly set forth in their respective entireties herein.

FIELD

The present application relates, generally, to content presentation and, more particularly, to a system and method for providing and interacting with coordinated presentations.

BACKGROUND

Interactive and supplemental content that has been made available to viewers has been done through a decoupled, separate communication channel. For instance, a producer can provide a separate communication channel with data, a video stream, or both at a URL associated with the broadcast. For example, a television station can have on-air programming and also provide supplemental content available through a website. Apart from sponsoring both sources of information, these communication channels are generally decoupled from one another. In other words, the broadcaster has only an indirect relationship to the viewer with regard to any supplemental content.

The present application addresses this in a system and method in which the broadcaster, who may be an individual using a portable computer device, provides viewers with the ability to launch supplemental content that has been curated by the broadcaster to the topics and information sources chosen by the broadcaster. As such, a more personal and deeper experience can be had by utilizing the present invention.

It is with respect to these and other considerations that the disclosure made herein is presented.

SUMMARY

A system and method are disclosed for generating a coordinated presentation. In one or more implementations, a computing device having a processor and a memory is configured by code stored in the memory and executed by the processor to generate the coordinated presentation. In one or more implementations, a curating content module is provided that comprises instructions executing so as to configure the processor to curate content selected by a user for inclusion in the coordinated presentation. Further, an audio/visual input module is provided that comprises instructions executing so as to configure the processor to capture, at least via a camera, a plurality of images for inclusion in the coordinated presentation.

Continuing with one or more implementations of the present application, a display module is provided that comprises instructions executing so as to configure the processor to display, via a display coupled to the computing device, a first arrangement of all of the curated content. Moreover, a user interface module is provided that comprises a touch-screen interface and further comprises instructions executing so as to configure the processor to enable user-based selection and manipulation of a portion of the curated content, wherein the portion is less than all of the curated content.

In addition, a video mixer module can be provided that comprises instructions executing so as to configure the processor to integrate the plurality of images captured by the camera together with a portion of the curated content via a user selection from the touch-screen interface, and thereby to generate a coordinated presentation that is capable of transmission to and receipt by one or more remote devices; and wherein the coordinated presentation is configured to enable interaction with the portion of the curated content at each of the remote devices such that results of a respective interaction at a particular remote device are viewable at the particular remote device but are not viewable at (a) other of the remote devices and (b) the display.

Other features and advantages of the present application will become apparent from the following description of the invention that refers to the accompanying drawings.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION

By way of introduction and overview, in one or more implementations, the present application provides systems and methods for authoring and playing video that can be layered with interactive content, including content that is available over one or more data communication networks, such as the Internet. Devices operating, for example, iOS, ANDROID, WINDOWS MOBILE, BLACKBERRY, MAC OS, WINDOWS or other operating systems are configured to provide functionality, such as an authoring tool and interface for developing distributable videos that include customizable and interactive features for use by one or more end-users that receive the videos. Further, the software applications provide a viewing/interactive tool, referred to herein, generally, as a "consuming" interface for end-users who receive videos that are authored in accordance with the present application. Using the client interface, users may interact with videos as a function of touch and gestures, as well as other suitable interfaces, such as a mouse, trackball, keyboard or other input. Some functionality available for end-users is defined by an author.

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present application.

Figure 1:
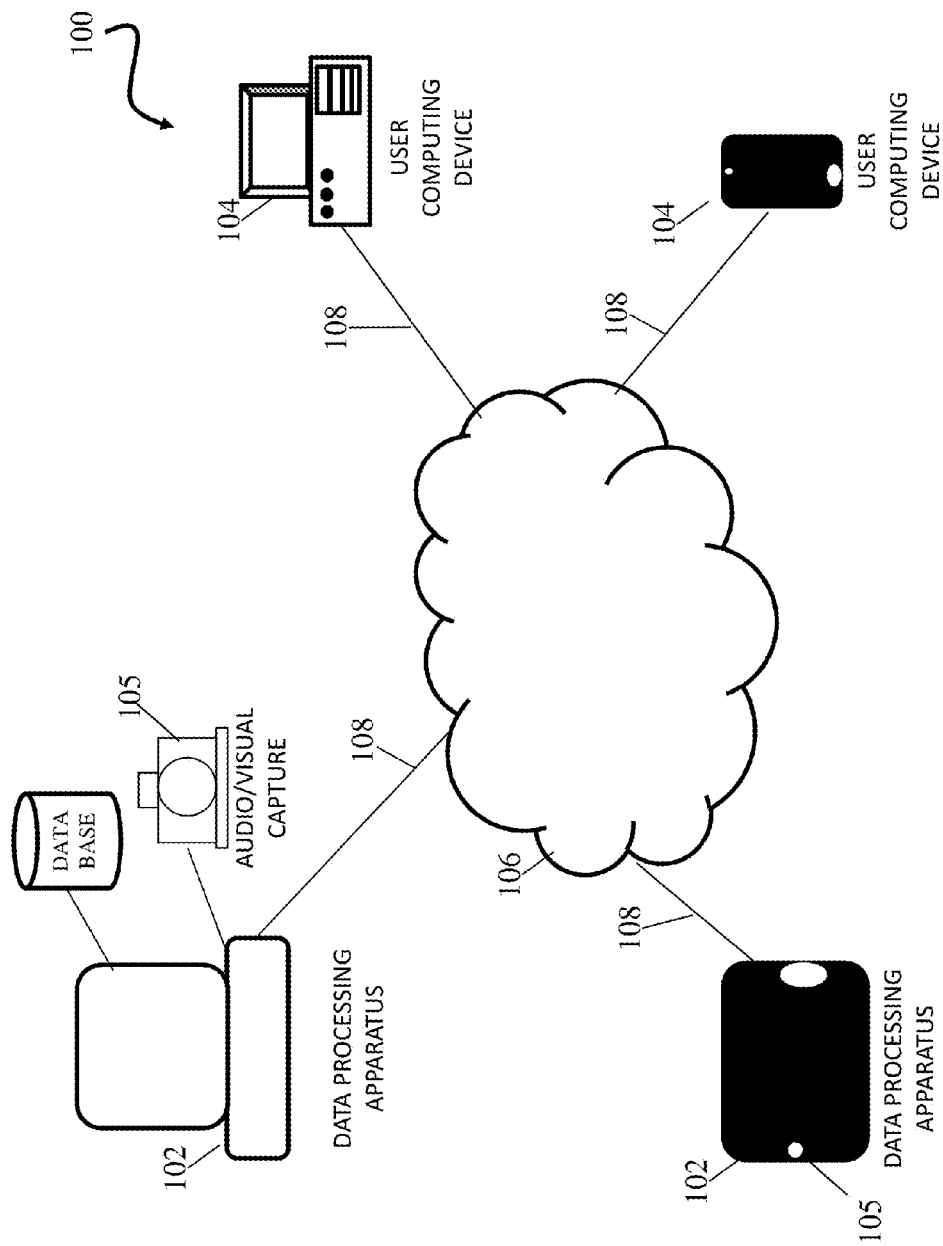
FIG. 1 is a diagram illustrating an example hardware arrangement that operates for providing the systems and methods disclosed herein.

Referring to FIG. 1 a diagram is provided of an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with a camera, a microphone, a microprocessor, and a communications module(s) and that is coupled to data processing apparatus 102. The audio/visual capture device 105 can be configured to interface with one or more data processing apparatuses 102 for producing high-quality audio/video content.

With continued reference to FIG. 1, data processing apparatus 102 can be configured to access one or more databases for the present application, including image files, video content, documents, audio/video recordings, metadata and other information. However, it is contemplated that data processing apparatus 102 can access any required databases via communication network 106 or any other communication network to which data processing apparatus 102 has access. Data processing apparatus 102 can communicate with devices comprising databases using any known communication method, including a direct serial, parallel, universal serial bus ("USB") interface, or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other means, to provide received data on display devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In one or more implementations, the present application provides improved processing techniques to prevent packet loss, to improve handling interruptions in communications, and other issues associated with wireless technology.

According to an embodiment of the present application, user computing device 104 provides user access to data processing apparatus 102 for the purpose of receiving and providing information. The specific functionality provided by system 100, and in particular data processing apparatuses 102, is described in detail below.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., un-switched data connection 108. Permanent connectivity ensures that access to data processing apparatuses 102 is always available.

Figure 2A:
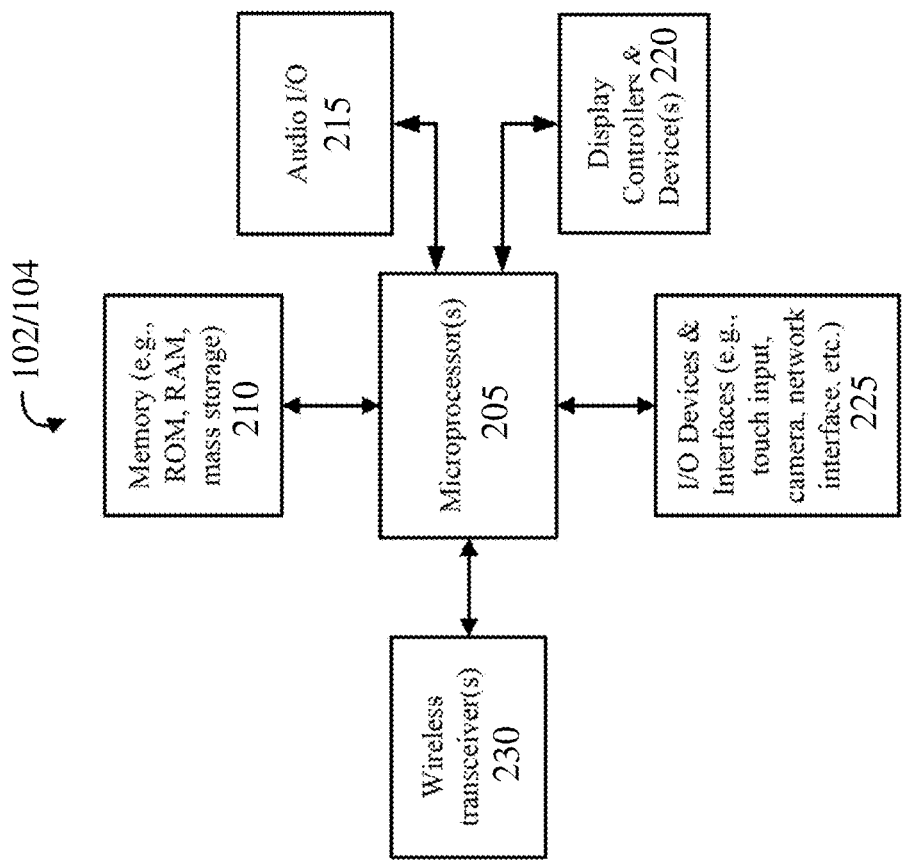
FIG. 2A is a block diagram that illustrates functional elements of a computing device in accordance with an embodiment.

FIG. 2A illustrates, in block diagram form, an exemplary data processing apparatus 102 and/or user computing device 104 that can provide functionality in accordance with interactive conferencing, as described herein. Although not expressly indicated, one or more features shown and described with reference with FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type.

The data processing apparatus 102 and/or user computing device 104 also includes an audio input/output subsystem 215 which may include a microphone and/or a speaker for, for example, playing back music, providing telephone or voice/video chat functionality through the speaker and microphone, etc.

A display controller and display device 220 provides a visual user interface for the user; this user interface may include a graphical user interface which, for example, is similar to that shown on a Macintosh computer when running Mac OS operating system software or an iPad, iPhone, or similar device when running iOS operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network.

It will be appreciated that one or more buses, may be used to interconnect the various modules in the block diagram shown in FIG. 2A.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network.

It will be appreciated that additional components, not shown, may also be part of the data processing apparatus 102 and/or user computing device 104, and, in certain embodiments, fewer components than that shown in FIG. 2A may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

Figure 2B:
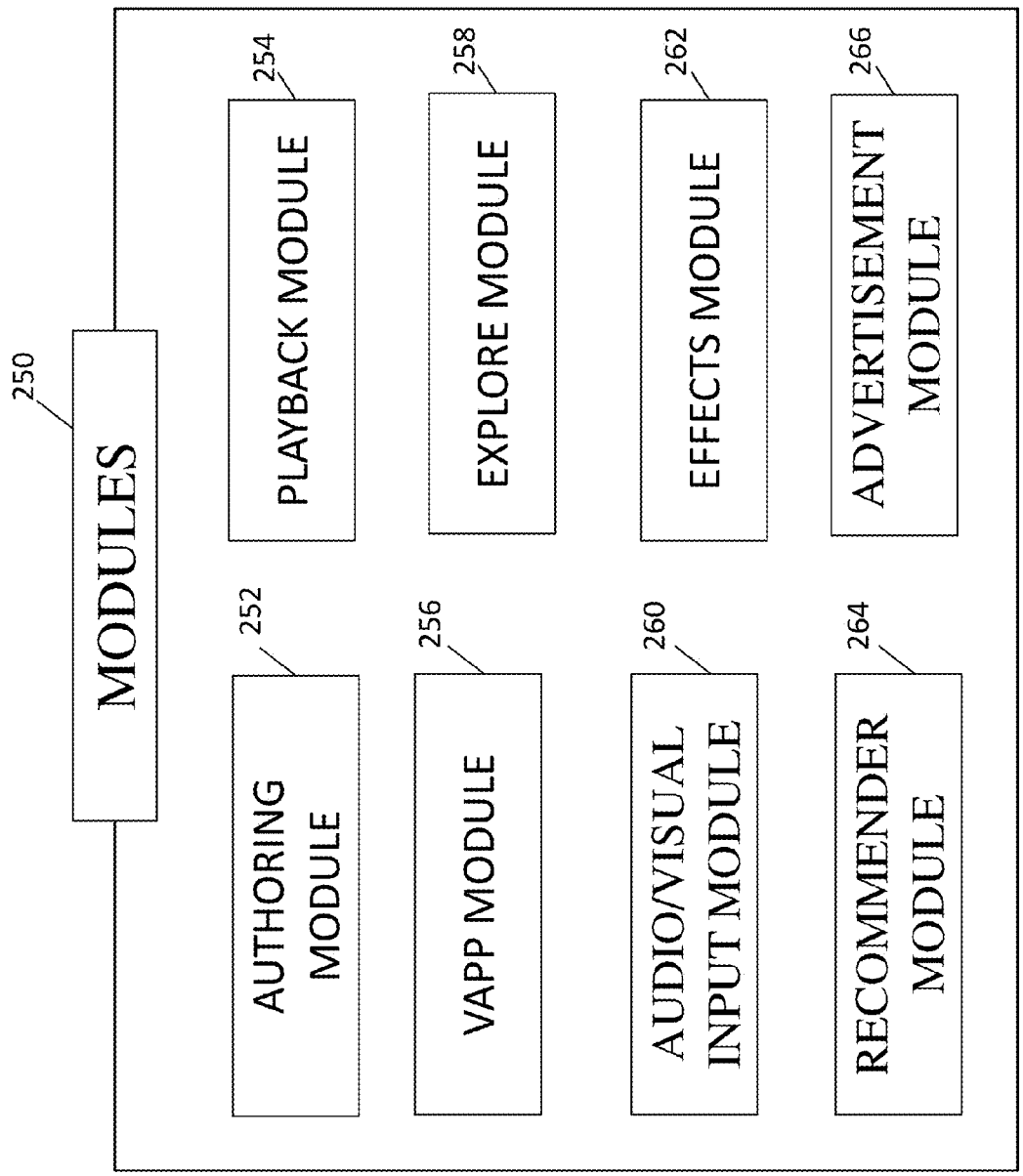
FIG. 2B is a block diagram representing a plurality of modules that provide functionality shown and described herein.

FIG. 2B is a block diagram representing a plurality of modules 250 that provide functionality shown and described herein. It is to be appreciated that several of the logical operations described herein can be implemented (1) as a sequence of computer implemented acts or program modules running on the various devices of the system 100 and/or (2) as interconnected machine logic circuits or circuit modules within the system (100). The actual implementation is a matter of design choice dependent on the requirements of the device (e.g., size, energy, consumption, performance, etc.). Accordingly, the logical operations described herein are referred to variously as operations, steps, structural devices, acts, or modules. As referenced above, the various operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein. Depending upon a respective implementation, the modules 250 can be provided via a single computing device, such as data processing apparatus 102, or can be distributed via a plurality of computing devices, such as computing devices 102 and/or 104. Moreover, one module can be provided via a single computing device (102 or 104), or can be distributed across a plurality of computing devices.

Included in the arrangement shown in FIG. 2B, various modules are programmatically tied by data processing apparatus 102 and/or user computing device 104. In the example shown in FIG. 2B is authoring module 252 that includes functionality for users to authoring videos that can be layered with interactive content. Playback module 254 includes functionality for users to execute (e.g., "play") such authored videos that can be layered with interactive content. Also illustrated in FIG. 2B is VAPP module 256 that is configured to provide tools (e.g., class files, packages or other program resources) that enable software developers to interface with one or more hardware and software systems and to develop and/or access custom video software applications, such as shown and described herein. Further, explore module 258 is configured to interface with one or more hardware and software systems, including user computing devices 104 and data processing apparatus 102.

Continuing with reference to FIG. 2B, Audio/Visual input module 260 includes functionality to interface with audio/visual devices, such as configured to interface with data processing apparatus 102 and/or user computing device 104. For example, Audio/Visual input module 260 interfaces with a camera and microphone communicatively coupled to data processing apparatus 102 for use in authoring videos that can be layered with interactive content, such as shown and described herein.

In one or more implementations, the present application can include an effects module 262 that enables one or more processing effects on audio and/or video. Among other effects, including those shown and described herein, green screen and white screen functionality can be provided to enable virtual placement of a presenter of video content in respective environments. Other example effects processing associated with effects module 262 is shown and described below.

Continuing with reference to FIG. 2B, Recommender Module 264 can be included that is configured to provide tools that interface with one or more hardware and software systems and to support content sharing and a new form of social networking as a function of accessible video files that can be layered with various interactive content, and that can be authored, distributed and played in accordance with the teachings herein. Further, Advertisement Module 266 can be included that is usable to interface with one or more hardware and software systems to provide advertisements in particular context and times.

The present application is now further described with reference to example display screens that show example functionality.

Figure 3:
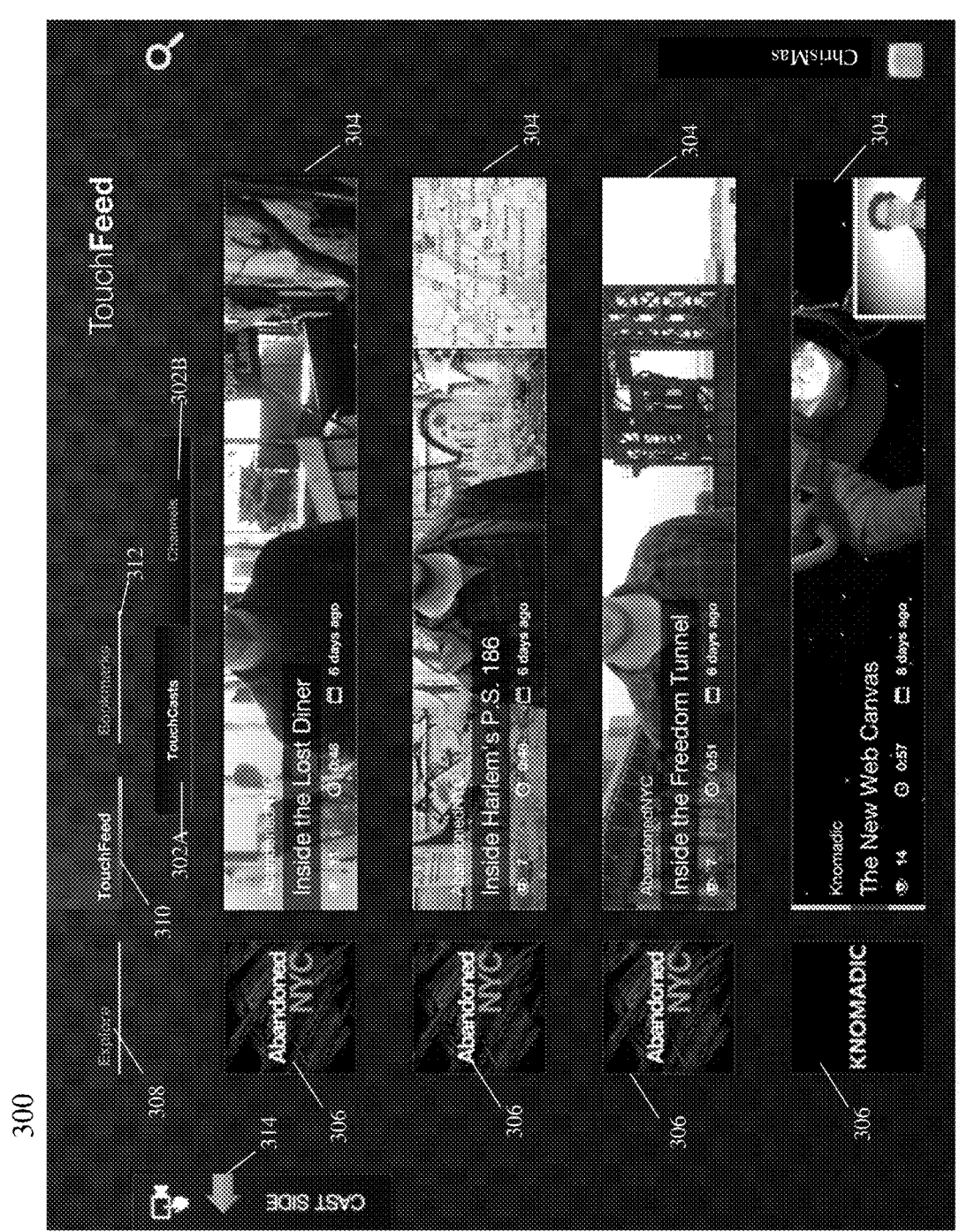
FIG. 3 is an example display screen that illustrates selectable video content that is available for viewing by a user, in accordance with an implementation of the present application.

FIG. 3 is an example display screen 300 that illustrates selectable video content that is available for viewing by a user, in accordance with an implementation of the present application. In the example shown in FIG. 3, options are provided for bookmarks that are available for two coordinated presentations. In one or more implementations, one or more options can be provided that, when selected by a user, results in instructions executed by a processor 205 to bookmark coordinated presentations 304 for future viewing. In the example shown in FIG. 3, one coordinated presentation 304 is entitled Inside Harlem's Public School 186 and the other coordinated presentation 304 is entitled Inside the Freedom Tunnel. Each of the coordinated presentations 304 is from presenter (or referred to and shown as "channel") 306 entitled Abandoned NYC. Also as shown in FIG. 3, information associated with a number of times the presentation has been seen, the length of the presentation and the number of days that have passed since the presentation was made and/or distributed is shown.

As used herein, a presenter 306 refers, generally, to a person, organization and/or computing device associated with either that makes and/or distributes coordinated presentations for others to view. In an embodiment, the presenter 306 Abandoned NYC is being followed by the user, thereby enabling coordinated presentations that are distributed by that presenter 306 to be received by this particular user.

Continuing with reference to FIG. 3, in addition to enabling a user to bookmark coordinated presentations for future viewing, display screen 300 includes other controls for a user. For example, explore control 308 can be provided that, when selected by a user, results in instructions executed by a processor 205 enables a user to explore a variety of coordinated presentations that have been created by one or more other presenters 306. In addition, Touchfeed control 310, when selected by the user, results in instructions executed by a processor 205 to locate and/or provide updated coordinated presentations for a user.

In one or more implementations, the present application includes functionality for a user to view and interact with coordinated presentations that are made and/or distributed by presenter 306. In addition, functionality is provided for users to make and distribute coordinated presentations to be viewed by others. In one or more implementations, such functionality for viewing and creating is provided in a single application. The ability to switch between viewing presentations and creating presentations is illustrated in FIG. 3 via Cast Side control 314. When selected, instructions associated with Cast Side control 314 can be executed by a processor 205 to invoke functionality associated with presentation creation and distribution, and presentation viewing and interaction.

Continuing with reference to the example shown in FIG. 3, two controls are provided that, when selected by a user, results in instructions executed by a processor 205 to enable a user to view coordinated presentations (shown and also referred to generally herein as "TouchCasts"). In an implementation, the user may alternate between viewing coordinated presentations and channels (e.g., presenters 306) by selecting TouchCasts control 302A and Channels control 302B. When a presenter 306 creates and/or distributes a new coordinated presentation, the present application is operable to locate and provide the new presentation substantially as shown in FIG. 3. Moreover, in one or more implementations, the coordinated presentations are provided in chronological order, such as in ascending order by date.

Figure 4:
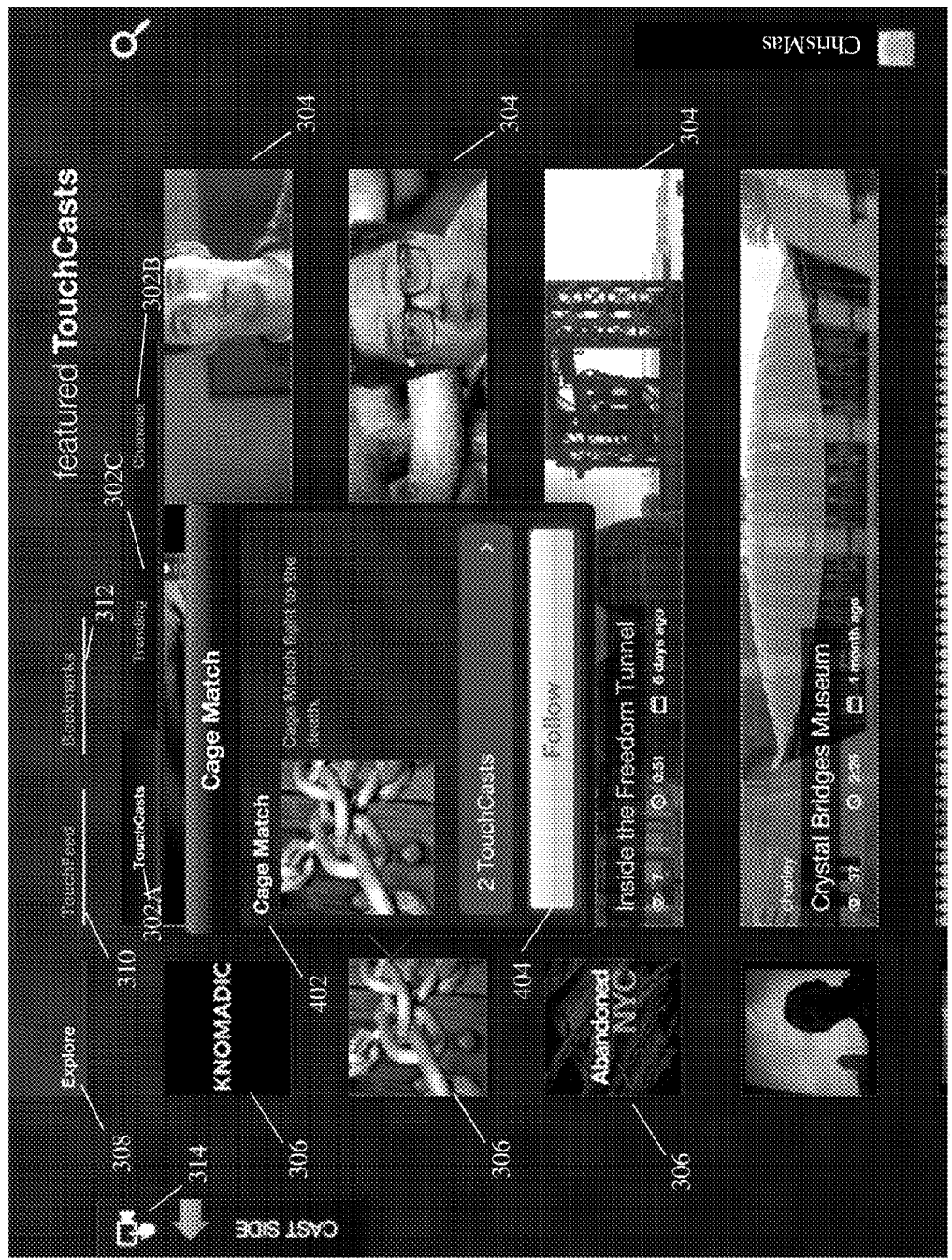
FIG. 4 illustrates an example display screen that is presented to a user who selects an option to explore coordinated presentations, in accordance with an example implementation.

FIG. 4 illustrates an example display screen 400 that is presented to a user who selects Explore control 308. As shown in FIG. 4, a plurality of presenters 306 is available for selection by the user. In this example, the user has selected the presenter 306, Cage Match. Upon selection, instructions can be executed by a processor 205 to provide a dialogue window 402 that includes information associated with the selected presenter, including the number of coordinated presentations ("TouchCasts") available for the viewer, and a control button 404 that enables the user to follow the presenter 306 in the future. By selecting control button 404, the user may view updated coordinated presentations made and/or distributed by the presenter 306, substantially as shown herein. Also shown in the example display screen 400 is Trending control 302C that, when selected, results in current trends associated with presenters and/or available coordinated presentations to be provided.

Figure 5A:
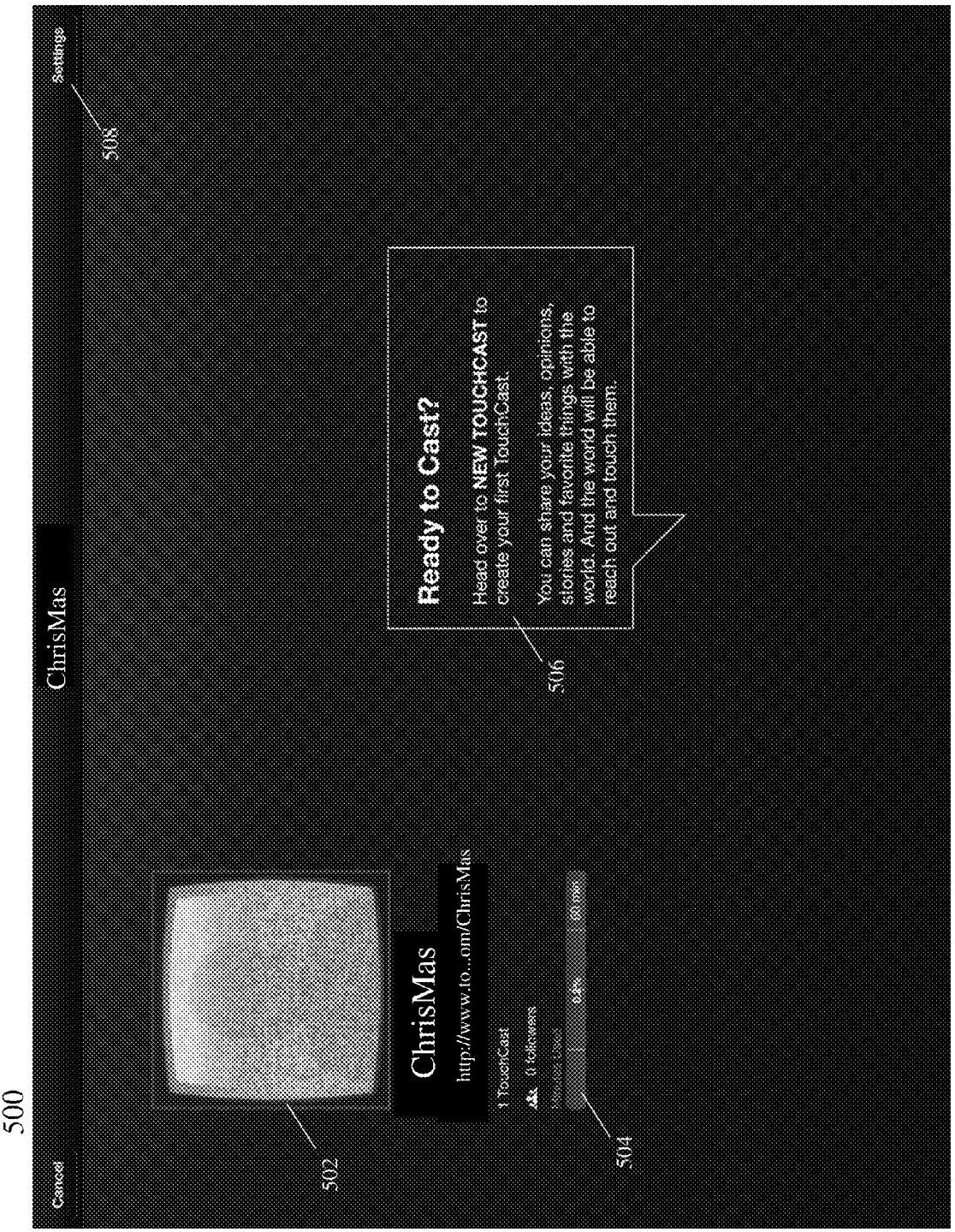
FIGS. 5A and 5B illustrate example display screens that are presented to a new user who is in the process of defining a new user profile, in accordance with an implementation.

FIG. 5A illustrates an example display screen 500 that is presented to a new user (Chris Mas) who is in the process of defining a new user profile. In the example shown in FIG. 5A, the new user has not been established in accordance with instructions executed by processor(s) 205, as a formal presenter 306 (e.g. has not defined a channel). Accordingly, a default icon 502 is presented that generically represents new users. Also as shown in FIG. 5A, information associated with the user, including a respective URL, is presented. In the example shown in FIG. 5A, the user has no followers and has made one coordinated presentation. In one or more implementations, each user is provided an amount of digital storage, for example for coordinated presentations. Various storage allocation possibilities are supported, including providing a relatively small amount of storage offered for free or at a nominal price, and a more significant amount of storage offered at a higher price. In the example shown in FIG. 5A, control 504 is provided that identifies the amount of storage that the user has remaining.

Figure 5B:
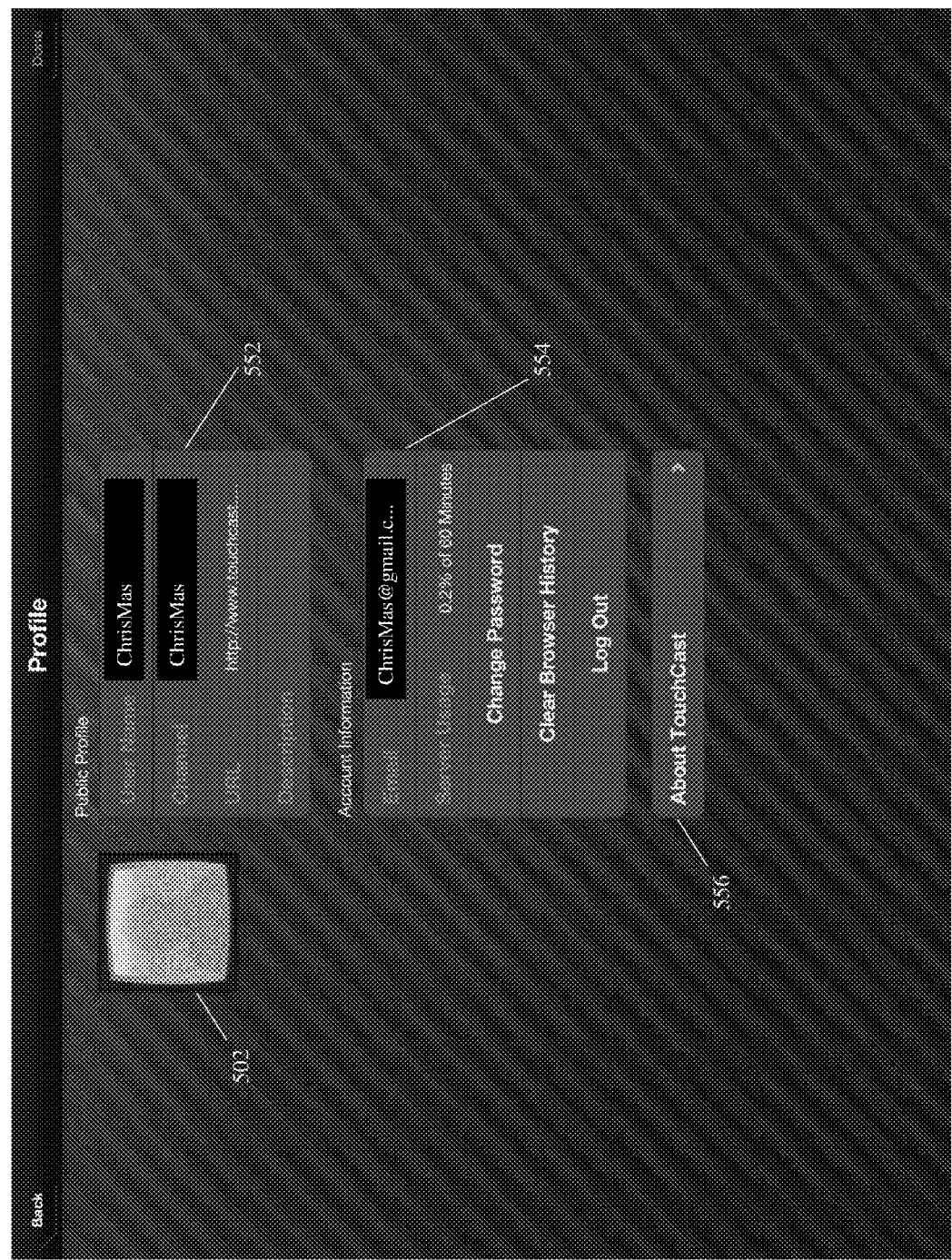

Also shown in FIG. 5A, Settings control 508 is available for user to submit one or more settings that data processing apparatus 102 and/or user computing device 104 to store and/or maintain information associated with the user's account and profile. For example and as shown in the example display screen 550 shown in FIG. 5B, options are provided for the user's "public profile" 552 that includes the user's name, channel name, URL and description. Other account information options 554 are provided for a user to submit information representing the user's email address, server usage information, password, control over browser history and logging out. Moreover, About TouchCast control 556 is provided for the user to obtain information associated with the present application, such as for assistance in connection with authoring a coordinated presentation.

Figure 6:
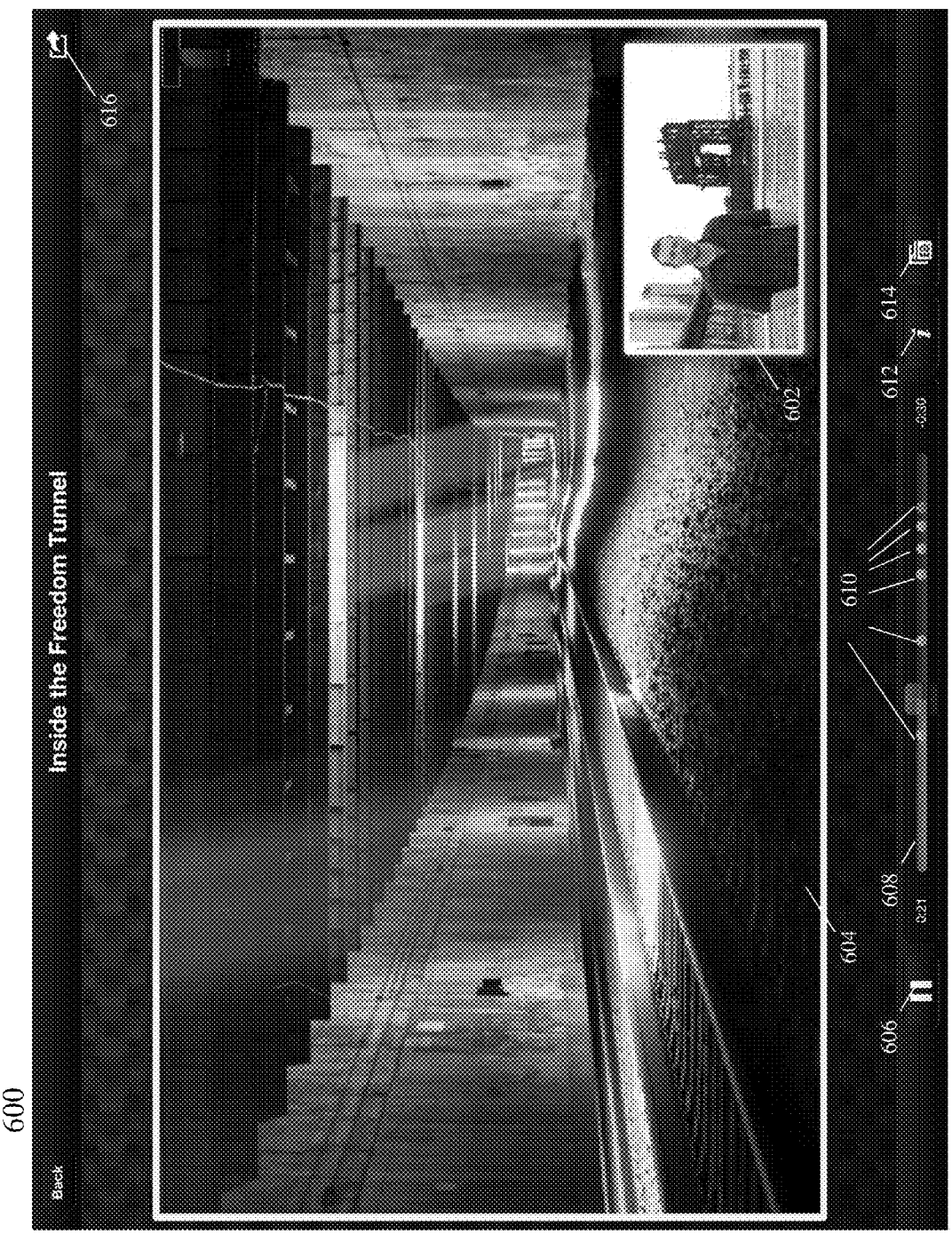
FIG. 6 illustrates an example display screen that shows an implementation of a user viewing and interacting with a coordinated presentation, in accordance with an example implementation.

FIG. 6 illustrates an example display screen 600 that is provided via data processing apparatus 102 and/or user computing device 104 and that shows an implementation of a user viewing and interacting with a coordinated presentation, in accordance with an example implementation. In this example, video 602 associated with the coordinated presentation ("Inside the Freedom Tunnel") is shown in in the lower right-hand corner. In addition, a photograph 604 is shown as a larger image and that contains the video 602 of the coordinated presentation. In this example, a user was viewing the coordinated presentation that included video 602 and images therein. The user selected (e.g. gestured, clicked or tapped) the image, which was thereafter provided substantially in full screen view (604) and the video 602 continued to run, for example, in a picture-in-picture interface. Thus, the photograph shown in display screen 600 was opened by the viewer as the coordinated presentation was being presented to the user.

Also illustrated in FIG. 6 are navigation controls that enable a user to move to preselected portions, as well as to any location of a coordinated presentation. As described in greater detail herein, coordinated presentations may be configured with interactive options, which may include images, video content, website content, or computer programs (collectively referred to herein, generally, as "vApps"). An authoring tool can be integrated with a player tool, and the tools enable one or more vApps to be embedded in video or, in one or more implementations, a code is embedded in the video for enhanced functionality. As shown in FIG. 6, play/pause button 606 is provided that enables a user to play or pause playback of a coordinated presentation. Timeline 608 is provided that identifies a current time location within a coordinated presentation as well as to navigate therein. VApp icons 610 represent vApps that are included with the current coordinated presentation at respective time locations therein. In accordance with one or more implementations, as a respective icon 610 is selected by the user, the coordinated presentation jumps to the corresponding time location, and the user can interact with the respective vApp. Information can be time coded in video, and selectable user interactive elements for navigation/time can be provided.

Figure 7:
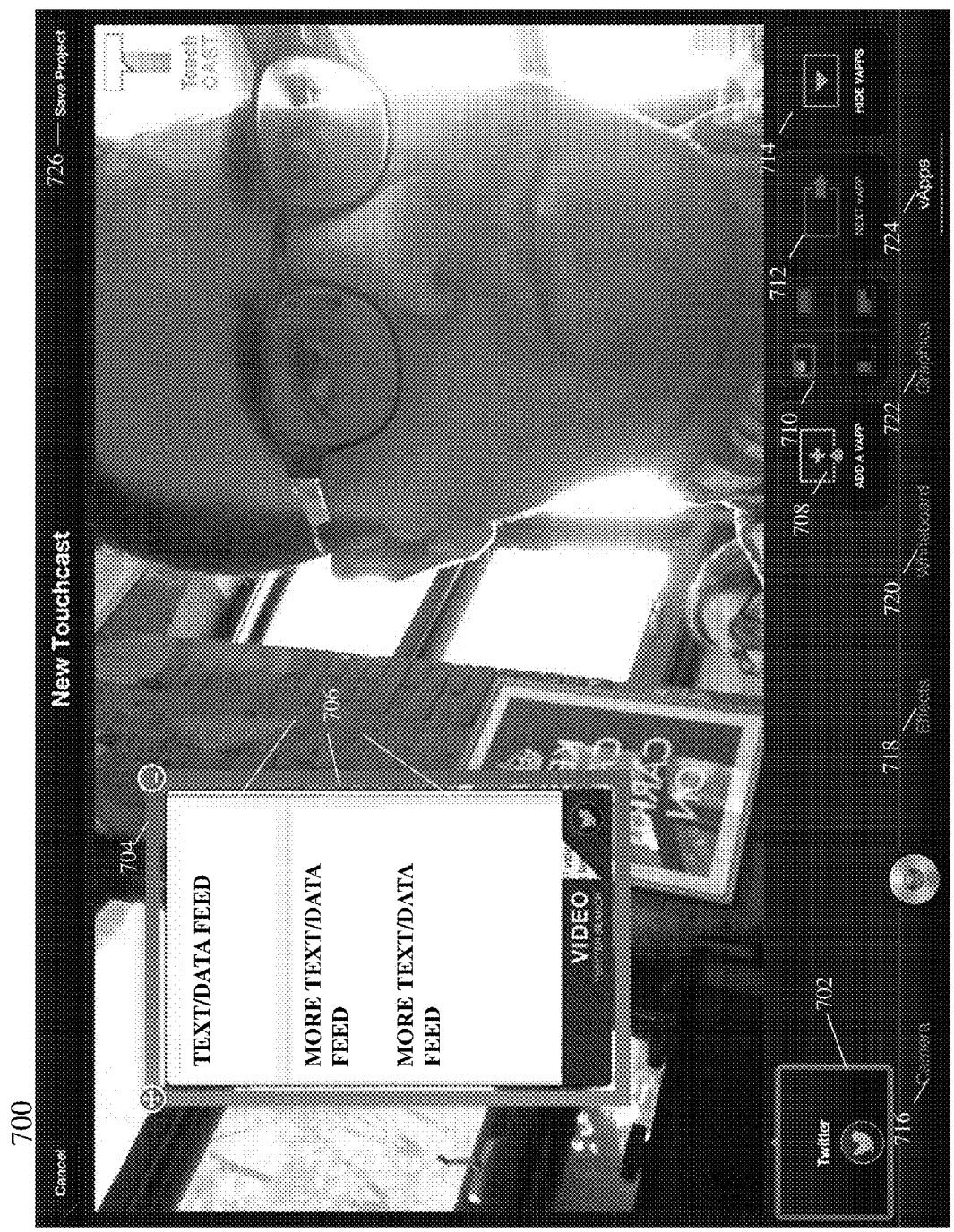
FIG. 7 illustrates an example display screen that is provided to a user who is creating a coordinated presentation, in accordance with an example implementation.

FIG. 7 illustrates an example display screen 700 that is provided to a user who is creating a coordinated presentation in accordance with an example implementation. In the example shown in FIG. 7, the user has added a new vApp to the coordinated presentation, a Twitter vApp. In the example shown, a Twitter feed is provided in response to a Twitter search. When a user views this coordinated presentation in the future, the Twitter feed will update to be current when the coordinated presentation is viewed, as opposed to when it is made or distributed. This represents a particularly powerful aspect of the present application. Coordinated presentations that include vApps may be made and distributed over time, and when viewed or interacted with in the future, the vApps may provide up to date and current content regardless of the time and date when the coordinated presentation was made and/or distributed. In the example shown in FIG. 7, respective Twitter entries 706 are included in Twitter feed 704, which the author may view as (s)he creates the coordinated presentation.

Near the bottom of display screen 700 are controls for a user to customize the coordinated presentation being authored. Add a VApp control 708, for example, enables a user to add a vApp, which in the example shown is in addition to the Twitter vApp. VApp location icons 710 provide display options, such as floating style, half screen, full screen, or picture-in-picture, for defining how a vApp appears in a coordinated presentation during playback. As the author records a coordinated presentation, for example, the author may decide that a vApp should appear in a particular context and at a particular time. Continuing with reference to the example display screen 700, Next VApp control 712 is provided for the author to customize settings associated with another vApp. Hide VApp control 714 is available for an author to hide the display of vApps while creating a coordinated presentation.

Other controls provided in example display screen 700 include controls for customizing a coordinated presentation in accordance with one or more implementations. Described in greater detail below, controls are provided that include Camera control 716, Effects control 718, White Board control 720, Graphics control 722 and VApps control 724. In the example shown in display screen 700, user has selected VApps control 724.

In addition, the present application enables users to select options that, when executed by data processing apparatus 102 and/or user computing device 102, save projects, such as via Save Project control 726. In accordance with one or more implementations, material be prepared months in advance of a coordinated presentation being completed and/or distributed. For example, a Twitter feed such as shown in FIG. 7 may be defined and saved as a project prior to the user recording any content for a coordinated presentation. In this way, projects may be considered as a collection of material that is usable in a future creation of coordinated presentations. Projects may include vApps that may provide graphics, video, or virtually anything that can be integrated in a coordinated presentation. Moreover, projects may be shared between users. For example, a user created a vApp associated with pyramids and which includes content from a variety of online sources. The user can then share that vApp with other users, who are thereafter able to make their own pyramid coordinated presentations using the first user's vApp. In this way a sort of social network of projects and vApps is provided for users to share and use in accordance with the present application. The present application provides an ability to share a project of interactive content for another video creator to use and various kinds of projects, coordinated presentations may be provided representing a person's setup. For example, teacher plans, student notes, and other session parameters can be generated and saved in accordance with the teachings herein.

Figure 8:
FIG. 8 illustrates an example display screen 800 that is provided to a user who is adding a video application, in accordance with an example implementation.

FIG. 8 illustrates an example display screen 800 that is provided to a user who is adding a vApp, for example, to a coordinated presentation or a project by selecting add a vApp control 808. In the example shown in FIG. 8, a plurality of vApp icons 802 are shown, each representing a respective vApp that can be configured and/or added to a project and/or coordinated presentation. Many of the vApps identified in display screen 800 are HTML-based that originate from one or more servers and are suitable for being layered on top of the coordinated presentation being developed by the user. Some of the vApps render "natively" on the viewer's client application, as opposed to other vApps that may pull content or information from one or more servers.

The present application can operate to provide functionality in two ways: 1) real-time compositing, which may include screen capturing of whatever is being displayed in the video frame, and 2) capturing meta-data that is around or otherwise associated with one or more elements on the screen, which is usable to report to a player device at a later point in time. Meta-data may include, for example, XML data. In this way, when a user interacts with a coordinated presentation, HTML (or other suitable content) may be served from the host server. This enables a fully (or at least partially) interactive platform.

In addition to preconfigured apps, such as for images, website content or the like, developer icon 802 is provided that includes functionality for a user to add a custom vApp. A custom vApp may be developed as a function of instructions executing on data processing apparatus 102 and/or user computing device 104. Functionality can be provided for a user to tap on or otherwise select a developer icon 802, which can result in instructions being executed to direct the user's computing device to a respective vApp for adding, for example, to a project. For example, a user develops a vApp that predicts the weather in Nebraska. Thereafter the user adds the weather predicting vApp to his coordinated presentation so that effectively the user can act as a weatherman. When a viewer subsequently views the coordinated presentation, the viewer gets real-time weather information in Nebraska.

In addition to vApps, which may be provided as a function of vApp control 804, the user may also be provided with a collection of projects, via Projects control 806.

Figure 9A:
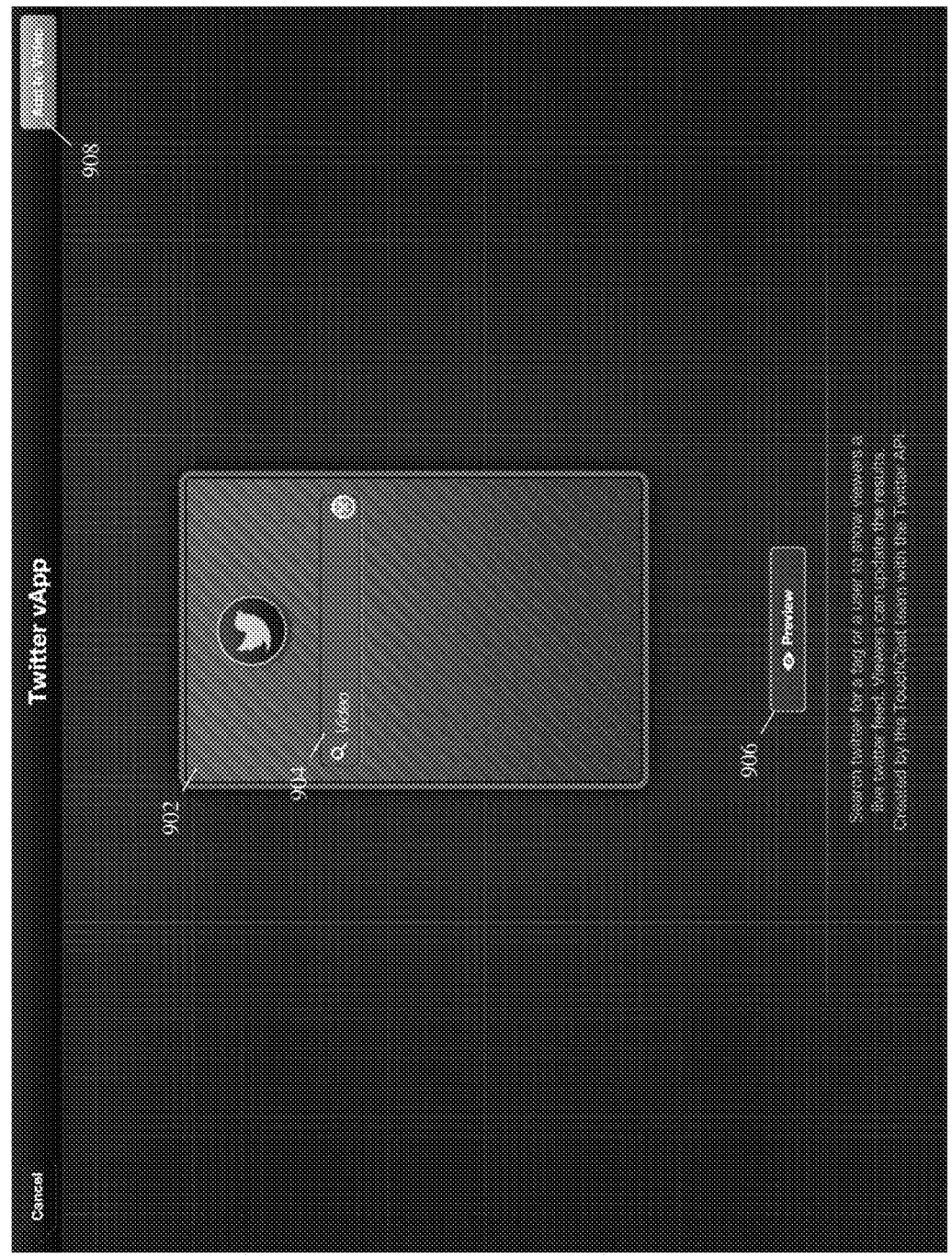
FIG. 9A illustrates an example display screen that is provided to a user who is adding a Twitter-related video application.

FIG. 9A illustrates an example display screen 900 that is provided to a user who is adding a Twitter vApp 902, for example, to a coordinated presentation and/or a project. In accordance with an example implementation and as shown in FIG. 9A, a vApp preparation mode is provided for a user to prepare the vApp before it gets added to a coordinated presentation. In this example, the author has configured the vApp 902 to search 904 for the word "video" as people are using that term on Twitter. As users tap or otherwise invoke the vApp, they will receive current results in Twitter for the search, "video." When the user wants to preview the effects of the vApp, the user selects preview control 906. When the user is satisfied with the results, the user may add the vApp to the user's coordinated presentation, for example by selecting Add to Video control 908.

Figure 9B:
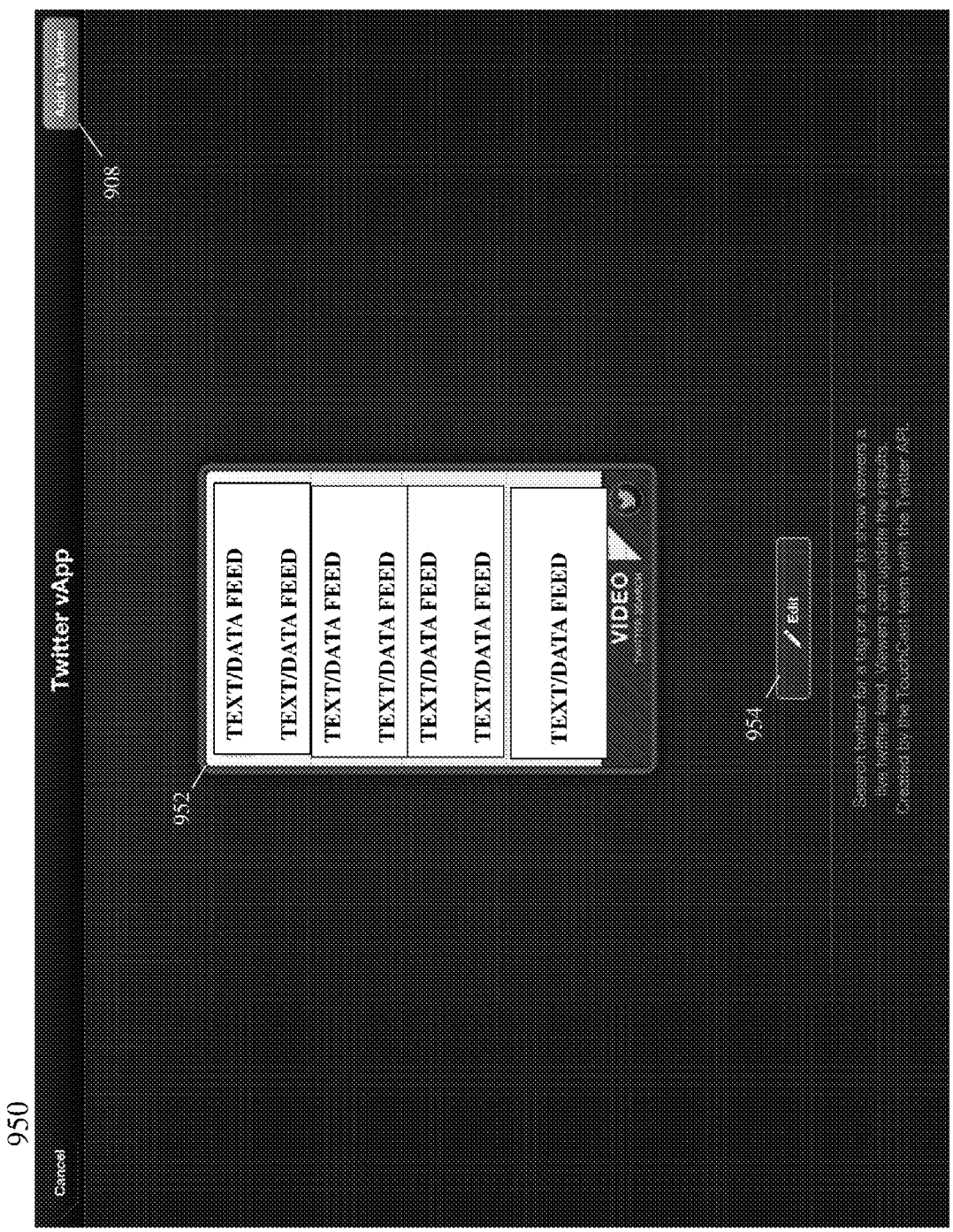
FIG. 9B illustrates an example display screen that is provided to the user after selecting preview control.

FIG. 9B illustrates an example display screen 950 that is provided to the user after selecting preview control 906 (FIG. 9A). In the example shown in FIG. 9B, Twitter feed 952 is displayed that includes recent posts that include the term "video." For the user's convenience, the term "video" is prominently displayed in the Twitter feed 952. In case the user wishes to make revisions or edits to the vApp, the user may do so, for example by selecting Edit control 954. When the user is satisfied with the results, the user may add the vApp to the user's coordinated presentation, for example by selecting Add to Video control 908.

Figure 9C:
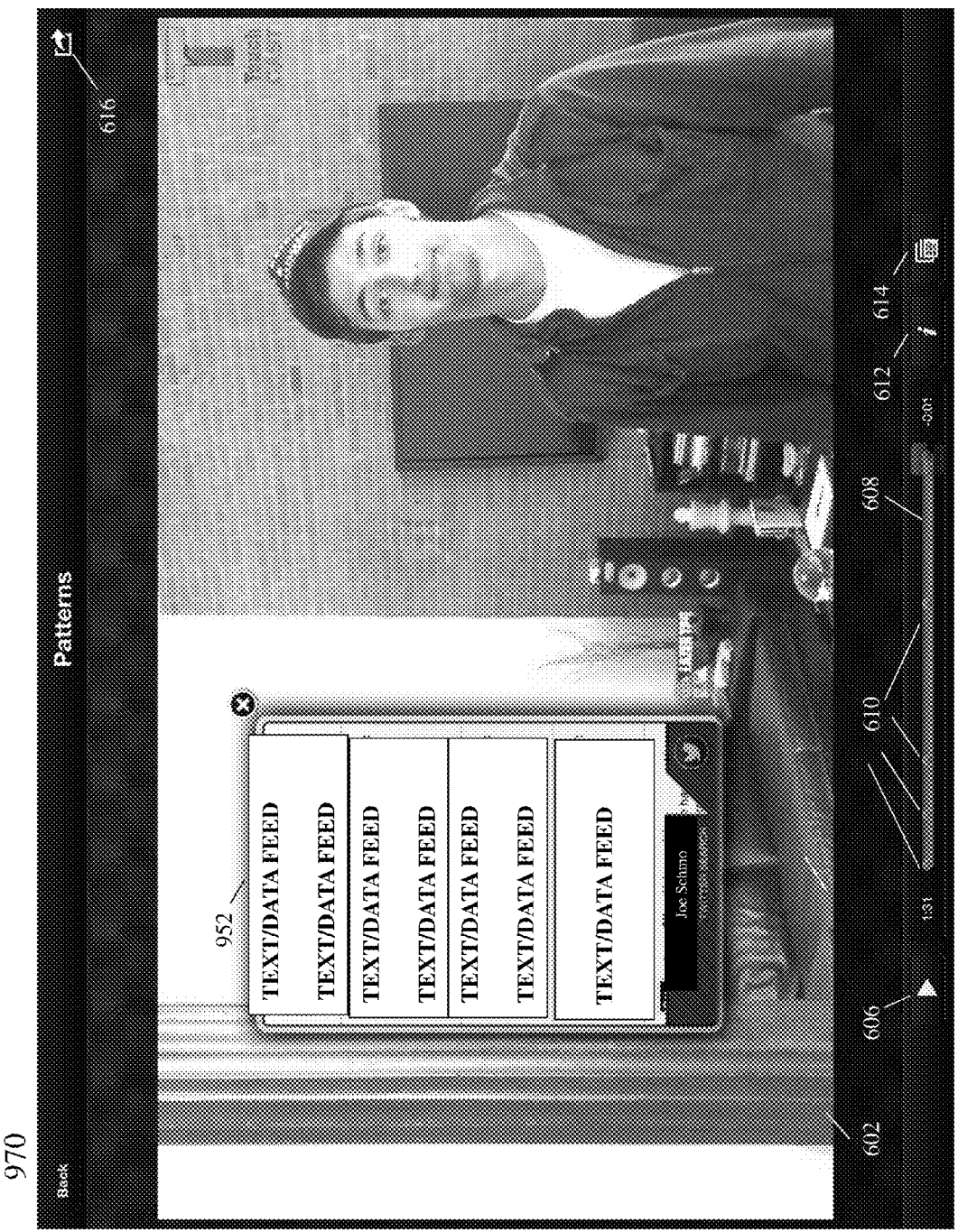
FIG. 9C illustrates an example display screen that represents a coordinated presentation being viewed by a user.

FIG. 9C illustrates an example display screen 970 that represents a coordinated presentation being viewed by a user. In the example shown, Twitter feed 952 is shown integrated with video content 502. In the example shown in FIG. 9C, the Twitter feed 952 is showing content associated with the Twitter search "Joe Schmo." The contents that are shown in the Twitter feed 952 has been selected in some way by the user, such as by gesture, tapping or mouse selection, and the latest tweets are displayed, notwithstanding the date that the coordinated presentation was created and/or distributed.

A discussion regarding additional functionality provided by the present application in connection with developing coordinated presentations is now provided with reference to FIGS. 10-16.

Figure 10:
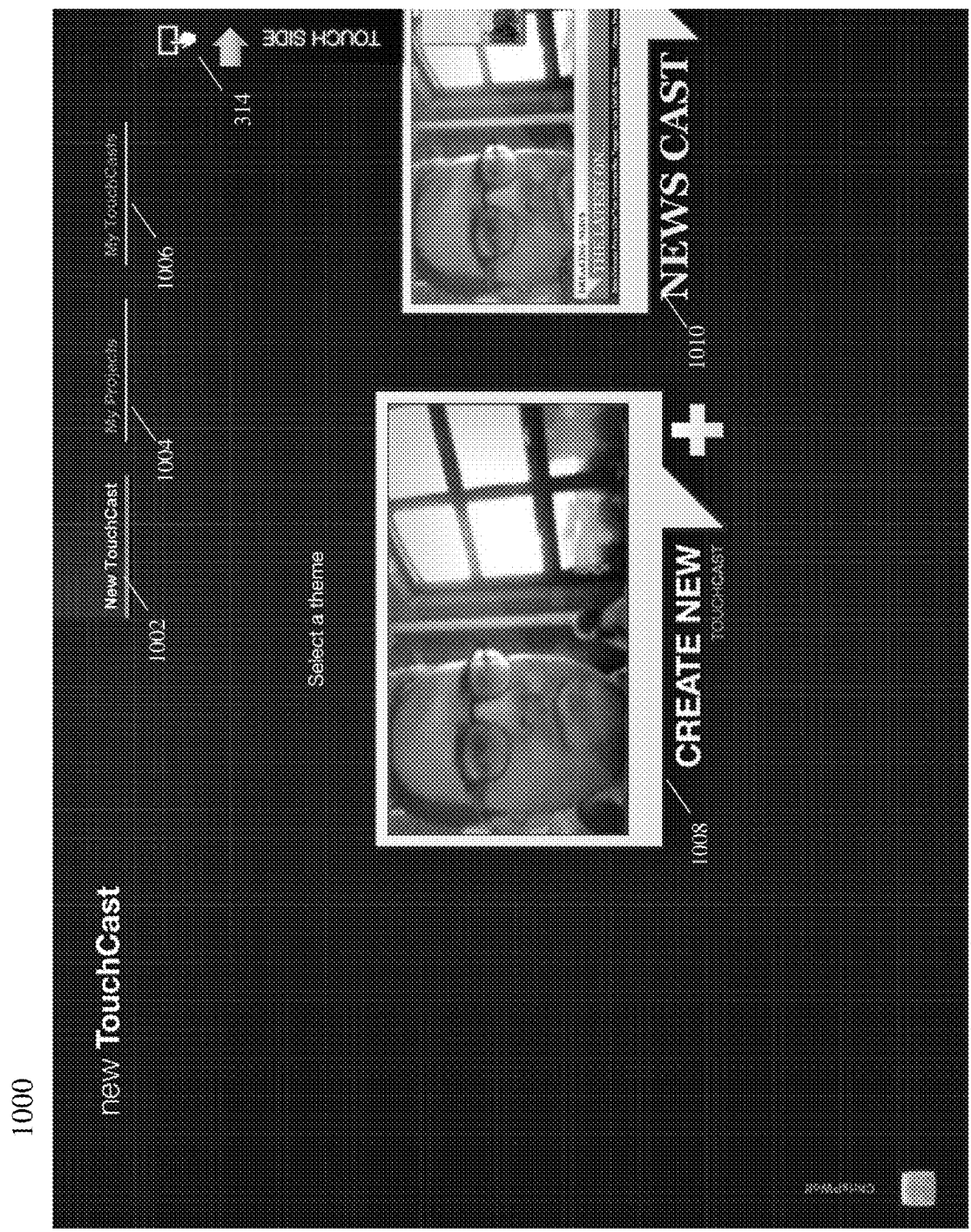
FIG. 10 illustrates an example display screen that is provided to a user for creating a new coordinated presentation in accordance with an example implementation of the present application.

FIG. 10 illustrates an example display screen 1000 that is provided to a user who has selected New TouchCast control 1002 for creating a new coordinated presentation in accordance with an example implementation of the present application. As shown in FIG. 10, a plurality of templates (also referred to generally as "Themes") may be provided for quickly creating a coordinated presentation that is configured with one or more features associated with a particular style or subject matter. In the example shown in FIG. 10, options are available for creating a new coordinated presentation (e.g., "TouchCast") 1008, which may be in a default configuration and absent of any particular theme, as well as for creating a new coordinated presentation in a particular theme (e.g. newscast). In addition to creating new coordinated presentations, such as via control 1002, options are available to review a user's previously stored projects (My Projects control 1004), and a user's previously saved coordinated presentations (My TouchCasts control 1006). Thus, as shown in displayed in FIG. 10, a user can select options for opening or adding coordinated presentations and/or project files and may do so in accordance with one or more preconfigured themes.

Figure 11:
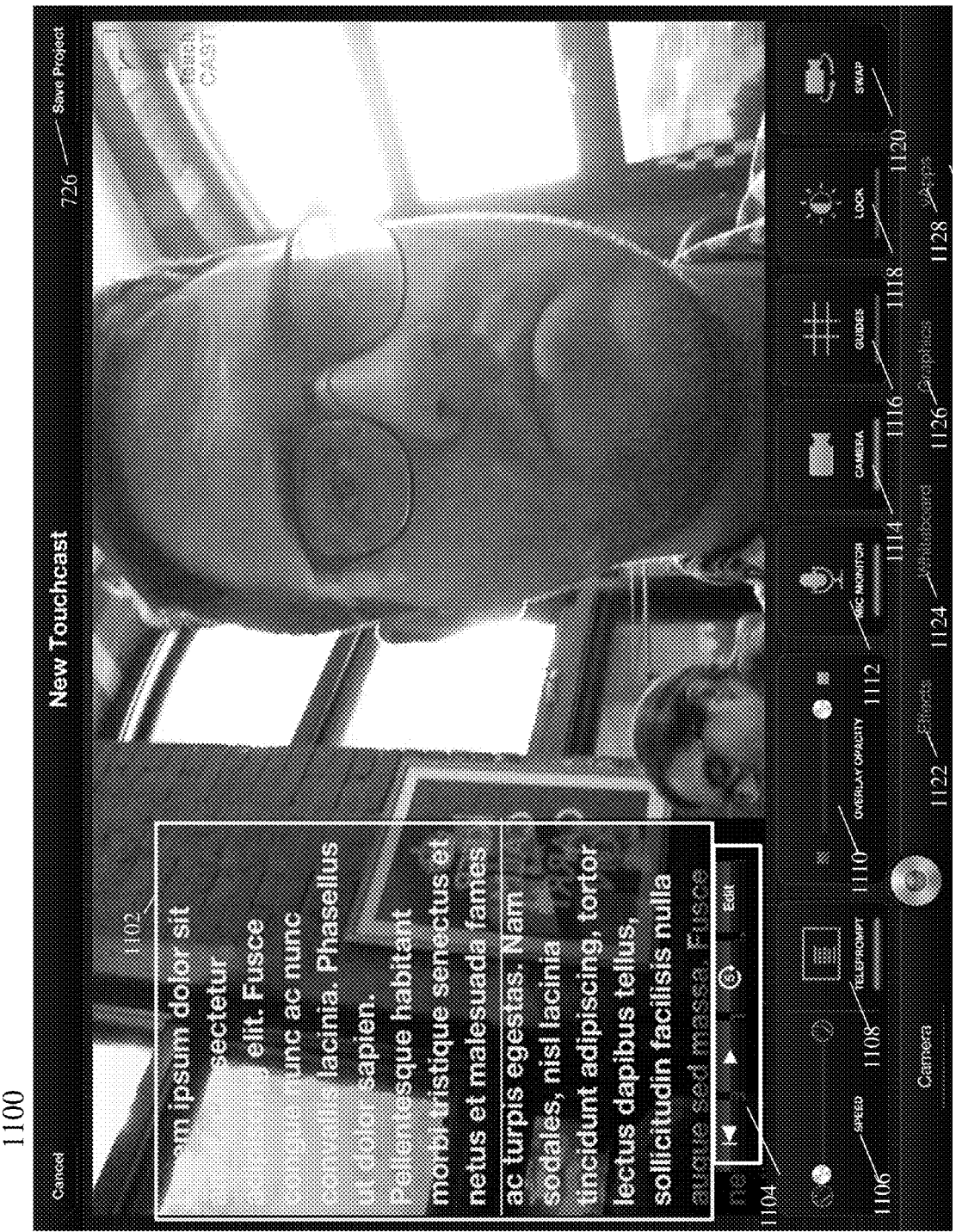
FIG. 11 illustrates an example display screen that is provided to a user who is recording a coordinated presentation in accordance with an example implementation.

FIG. 11 illustrates an example display screen 1100 that is provided to a user who is recording a coordinated presentation in accordance with an example implementation. As shown in FIG. 11, functionality associated with a virtual teleprompter 1102 is provided for user to read as the user records the presentation. Teleprompter playback controls 1104 are provided for the user to rewind, play, skip ahead via particular increment or edit copy that is displayed. Moreover, speed control 1106 is included for controlling the speed at which the teleprompter scrolls the copy being displayed.

In addition, other controls are provided and shown in the example display screen 1100. For example, Overlay Opacity control 1110 is provided for controlling the opacity of the teleprompter (or optionally other content), Microphone Monitor control 1112 which enables the user to control the variable sensitivity of a microphone. Furthermore, Camera control 1114 is provided to enable a user to include live video from the user's camera as a background to the user's coordinated presentation. For example, the Camera control 1114 may be set to off or on. In case the control 1114 is off, the user may use virtually any other content, such as video, an image file, or the like, that the user wants as a background to the coordinated presentation. Further, Guides control 1116 displays guidelines for helping the user position content accurately. Lock control 1118, when selected, enables the user to define particular exposure settings. For example, after selecting the Lock control 1118, user may tap or otherwise select a particular portion of the display, such as the user's face, and exposure is corrected for the user's face. Swap control 1120 enables the user to select, for example, a front camera or rear camera that is configured with the user's computing device (i.e. tablet computer). In the event the user has a plurality of cameras installed, such as on a personal computer, swap control 1120 is usable to select among the plurality of cameras. In one or more implementations, copy that is displayed in the virtual teleprompter is not saved to or otherwise displayed in the coordinated presentation. In other words, viewers of the coordinated presentation will not view the contents of a virtual teleprompter, unless the author so desires.

In addition to controls associated with the virtual teleprompter, other controls are included in the example display screen 1100 including Effects control 1122, Whiteboard control 1124, Graphics control 1126 and vApps control 1128. These controls, shown and described in greater detail herein, provide additional flexibility and functionality for a user to create a coordinated presentation.

Figure 12:
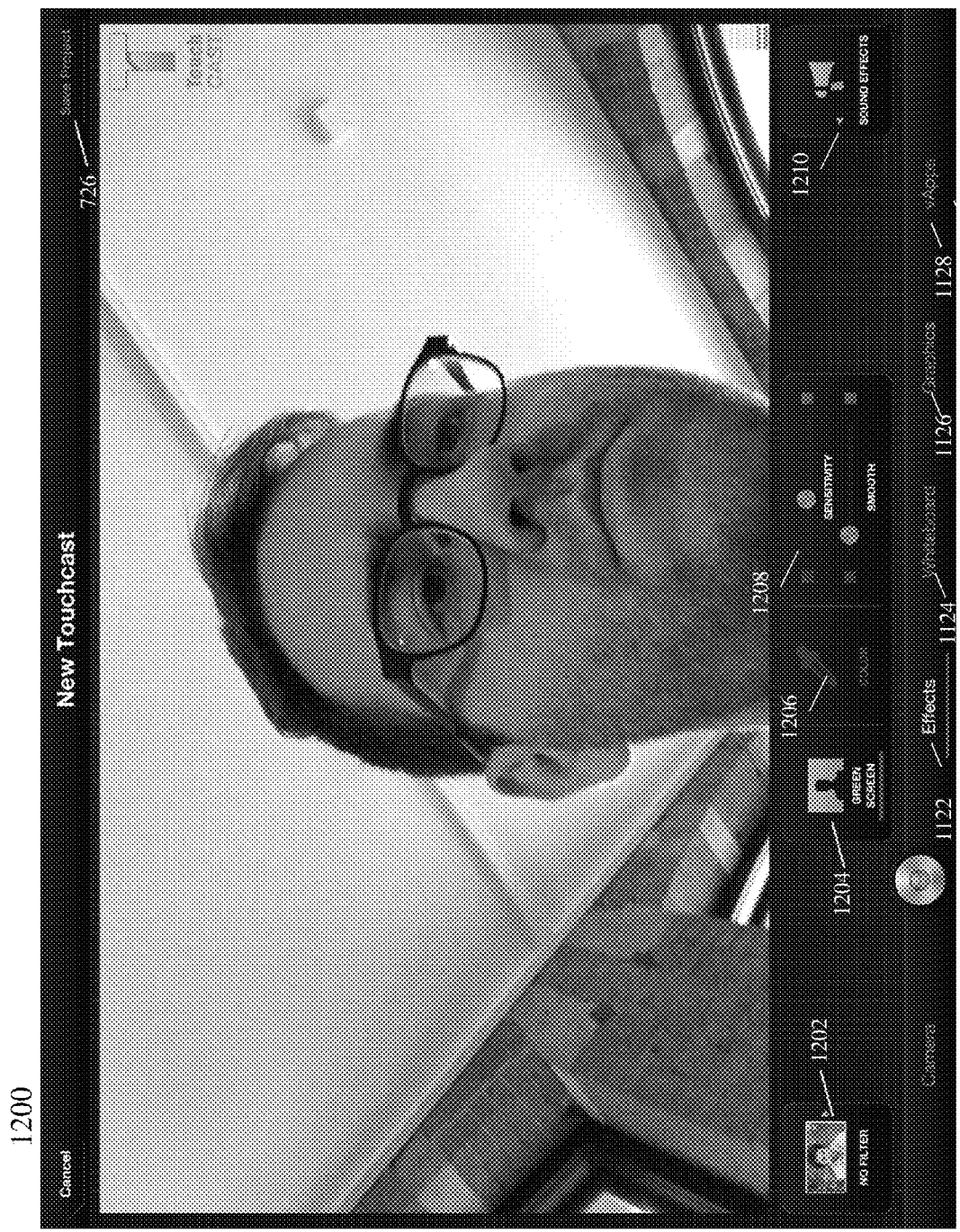
FIG. 12 illustrates an example display screen that is provided to a user who has selected a graphical screen control for adding effects.

FIG. 12 illustrates an example display screen 1200 that is provided to a user who has selected Effects control 1122 (FIG. 11). Filter control 1202 is usable, for example, further adding graphical controls to the coordinated presentation. Examples include, for example, sepia, black and white, solarize or other visual effects that can be applied to an image or video. Green screen control 1204 is usable to enable a user to provide a virtual green screen. For example, a user may overlay a virtual background in a coordinated presentation in one or more locations that are defined as a function of color. Color dropper control 1206 enables the user to define a particular color, such as one or more pixels, for suitable portions of the background of the coordinated presentation to be replaced by other content, such as an image. Using the controls provided, for example, in the example display screen 1200 enables an extremely flexible way to define custom green screen functionality for coordinated presentations. Other controls included in example display screen 1200 are Sensitivity and Smooth sliders 1208, which operate to impact the relative smoothness and impacts of green-screen content. Further, Sound Effects control 1210 enables soundboard functionality which can be selected during recording of a coordinated presentation. For example, a car horn, cymbal crash or virtually any other sound effect can be added to a coordinated presentation.

Figure 13:
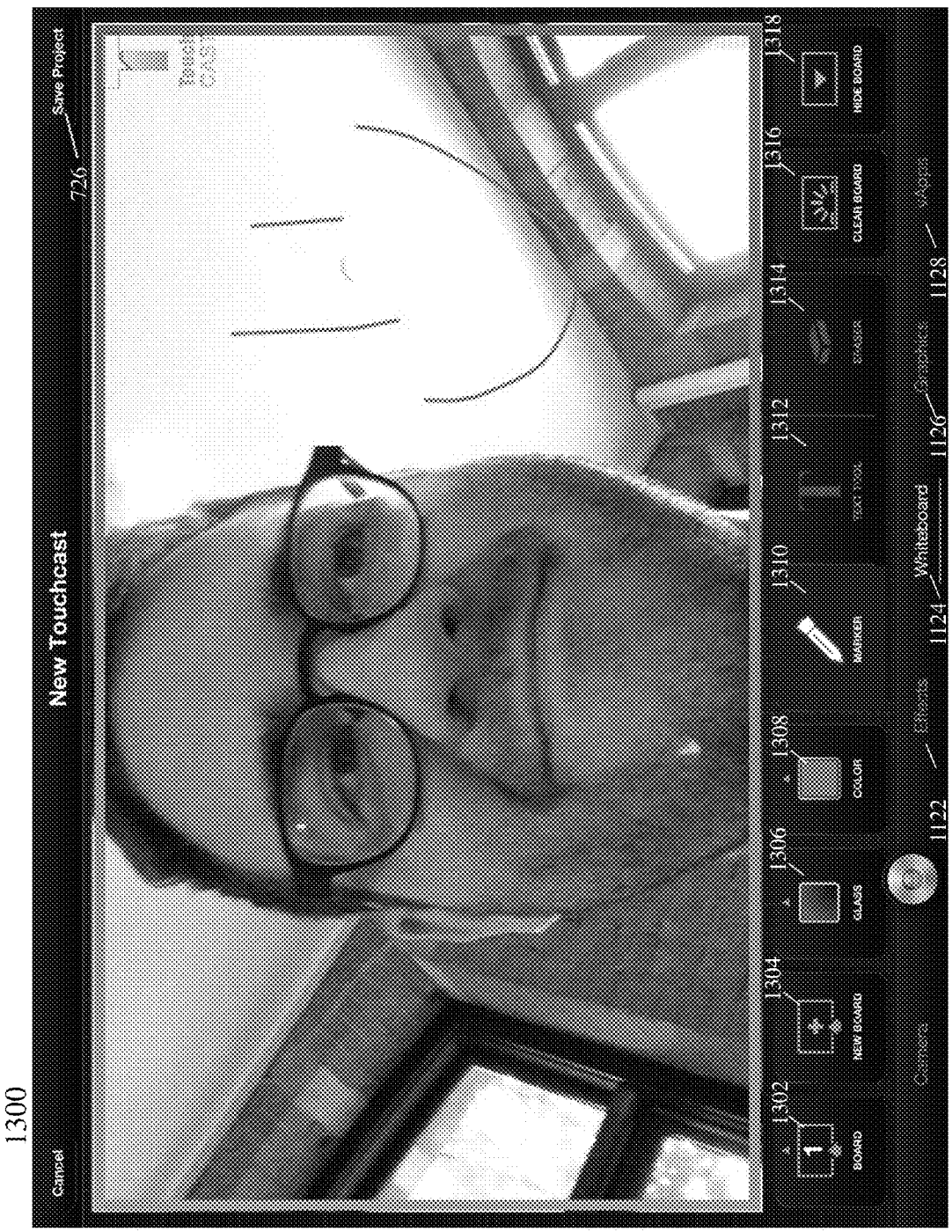
FIG. 13 illustrates an example display screen that is provided to a user who has selected a graphical screen control for a whiteboard.

FIG. 13 illustrates an example display screen 1300 that is provided to a user who has selected Whiteboard control 1024. Using boards with a coordinated presentation is useful for users to annotate or otherwise enhance the display associated with the presentation. In one or more implementations, content provided via whiteboards (or other type of virtual board) is not interactive for users viewing a coordinated presentation.

As shown in FIG. 13, Board 1 control 1302 identifies a board that has been made previously by a user and is selectable for further editing. New board control 1304, when selected, enables a user to add a new board. Glass control 1306, when selected, enables a user to choose from a variety of glass appearances, as well as is usable to select a particular kind of board, such as a clear board, a chalkboard, a whiteboard or other type of board. Color control 1308 enables a user to select from a variety colors. Marker control 1310, when selected, enables a user to select one or more marker styles, such as relating to thickness, color, or other properties. Textual control 1312 allows user to type, and format the text, such as in a particular font and point size. Eraser control 1314 enables the user to select one or more portions of the board for erasing. Clear board control 1316 is usable to erase the contents of a full board. Hide board control 1318 is usable to enable a user to cause one or more boards to be caused to appear or disappear from view.

Figure 14:
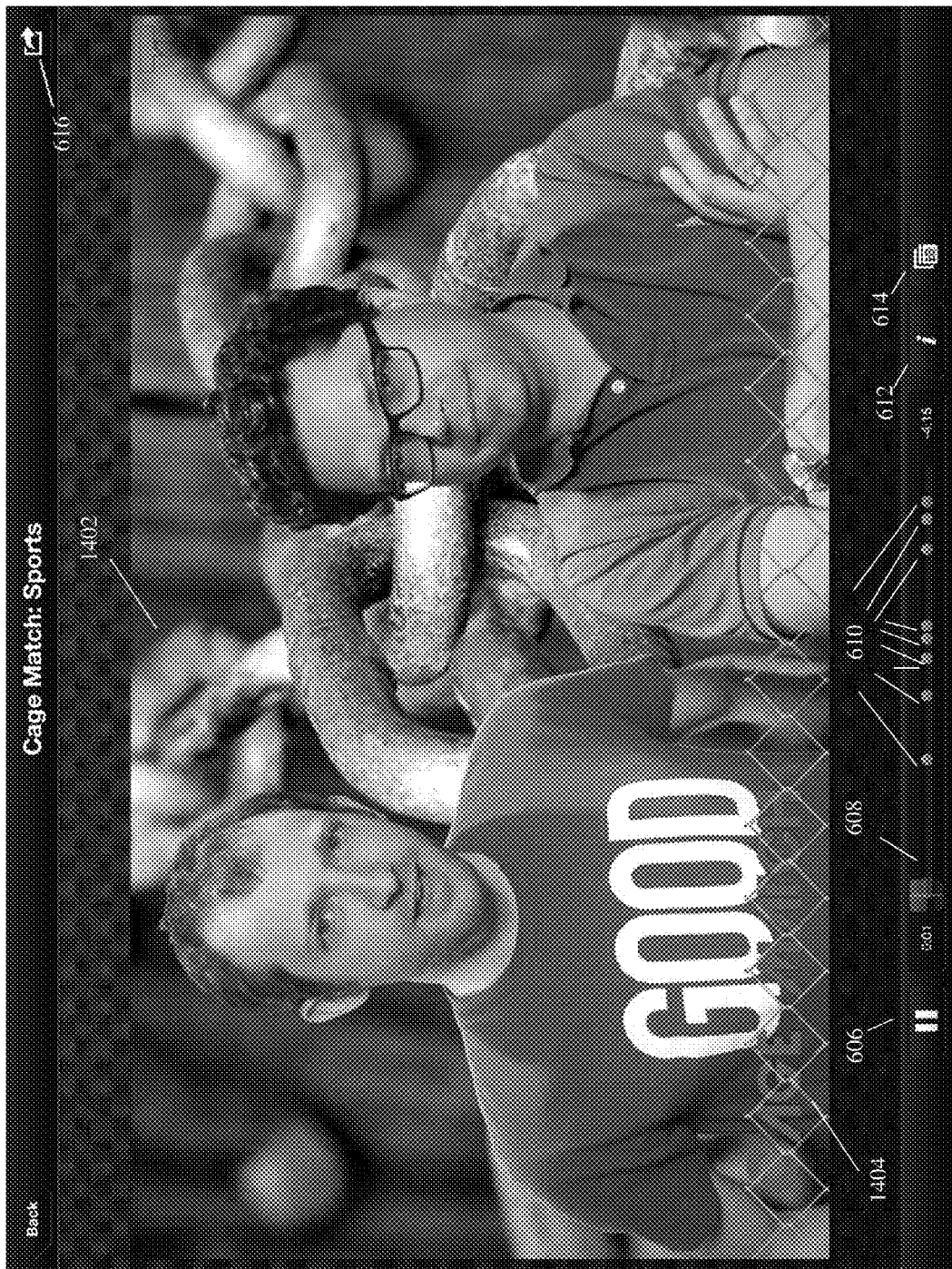
FIG. 14 illustrates an example coordinated presentation that illustrates the effect of the green screen functionality, in accordance with an example implementation.

FIG. 14 illustrates an example coordinated presentation that illustrates the effect of the green screen functionality, such as described. As shown in FIG. 3, green screen portion 1402 is shown in connection with an image file of a chain linked fence behind the people shown in the coordinated presentation. Also included in FIG. 14 is an example of a title graphic 1404, which is also a chain link.

Figure 15:
FIG. 15 illustrates an example coordinated presentation that is being developed and that includes the addition of a title graphic.

FIG. 15 illustrates an example coordinated presentation that is being developed and that includes the addition of a title graphic 1504. Title graphics are useful to add flair and information in a coordinated presentation. In the example shown in FIG. 15, controls 1502 are provided for adding new title, for displaying an amount of time before a title disappears (i.e., timeout), for adding a new title and for hiding a title during playback. In one or more embodiments, users may upload their own graphics for use in title graphics. In an embodiment, a user who is uploading a graphic for a title is prompted with proper image size ratios to ensure a suitable fit. Alternatively, the present application may scale, crop, or otherwise adjust a graphic file that is uploaded for purposes of being added as a title pursuant to one or more specifications, including specifications that may be selected by the author of a coordinated presentation.

Figure 16:
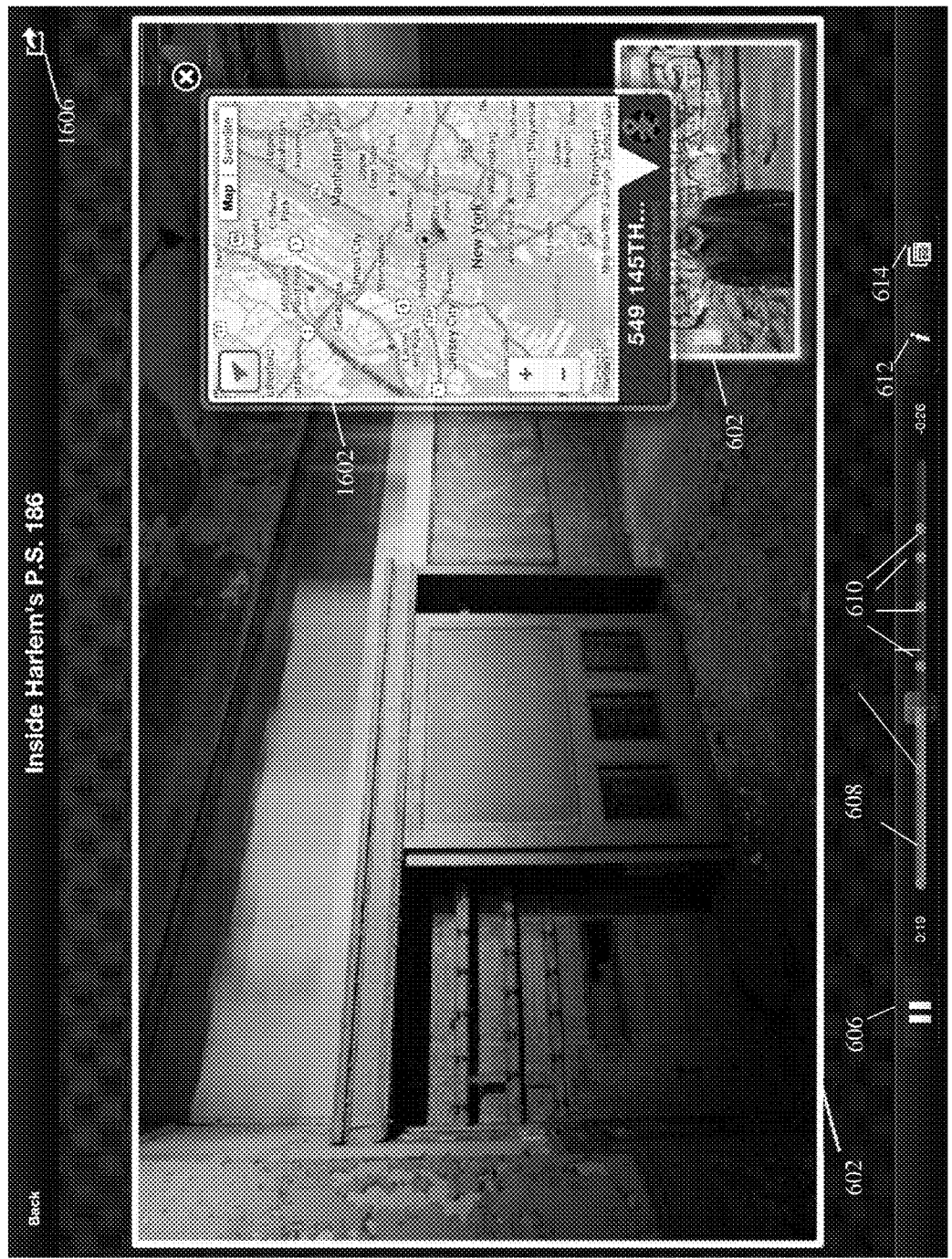
FIG. 16 illustrates an example display screen representing a coordinated presentation that includes a video application of an interactive map that is overlaid on the coordinated presentation.

FIG. 16 illustrates an example display screen 1600 representing a coordinated presentation that includes a vApp 1602 of an interactive map that is overlaid on the coordinated presentation. In the example shown in FIG. 16, a user was viewing a coordinated presentation, and selected a vApp 1602 associated with the interactive map. Thereafter, the map opened and the user is able to interact with the map, for example by zooming in or moving to new location. In the example shown in FIG. 16, the vApp 1602 opens to a location defined by the author of the coordinated presentation. In one or more implementations, the vApp 1602 (e.g., map) stays open until the user clicks the X button and closes it. In one or more implementations, the viewer may have given permission for the application to access the user's physical location, which may directly impact the location or other content shown in the vApp 1602.

It is to be appreciated that although many of the examples shown and described herein regard distribution of coordinated presentations to a plurality of users via mobile computing devices, the invention is not so limited. It is envisioned that part or all of the functionality shown and described herein may be provided via an Internet web site.

Figure 17:
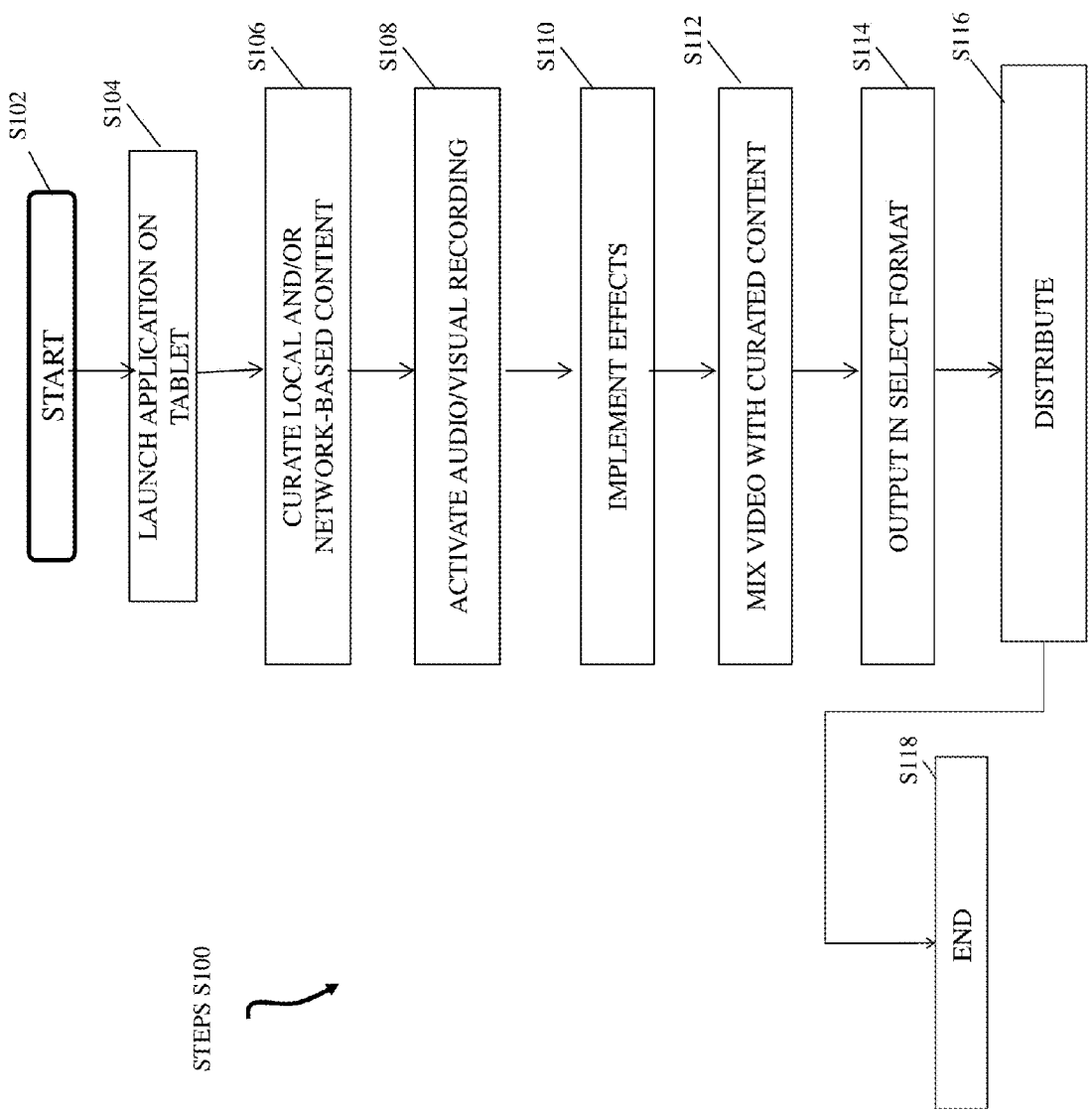
FIG. 17 is a flow diagram showing a routine that illustrates a broad aspect of a method for authoring a coordinated presentation.

Turning now to FIG. 17, a flow diagram is described showing a routine S100 that illustrates a broad aspect of a method for authoring a coordinated presentation 304 in accordance with at least one implementation disclosed herein. It should be appreciated that several of the logical operations described herein are implemented (1) as a sequence of computer implemented acts or program modules running on computing device 102/104 and/or (2) as interconnected machine logic circuits or circuit modules within computing device 102/104. The implementation is a matter of choice, dependent for example on the requirements of the device (e.g., size, mobility, energy, consumption, performance, etc.). Accordingly, the logical operations described herein are referred to variously as operations, steps, structural devices, acts, or modules. As referenced above, various ones of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

At step S102, the process starts, for the example, as an app launching on a tablet computing device or a web browser connecting to a respective Internet web page. At step S104, options in the form of graphical screen controls are provided to a user for authoring a coordinated presentation 304, for example, in the form of drop-down lists, buttons, checkboxes, textboxes, icons or the like, which are selectable and that cause one or more modules to execute instructions associated with the respective control. At step S106, options are selected for curating content, such as content that is stored locally on the user's computing device 102 and/or 104, or content that is available via a data communication network. Curating can be enabled, for example, by selecting one or more hyperlinks to content that is accessible over a data communication network. Other content, such as images, video, songs, text or the like can be selected, such as in response to user-based gestures. The present application further supports video capture of one or more web pages at a moment of recording. For example, once a link corresponding to web page(s) is selected, substantially real-time content from the respective web page is provided during playback of the coordinated presentation 304. At least some of the curated content, video content, contextual information (links to content as referenced in video) can be displayed in frames or in a frameless application. Content can be provided in a player, and as content is selected, further information may be provided in a related video/webpage.

Continuing with the example process S100 shown in FIG. 17, at step S108, one or more recording options, such as for audio and/or visual recording, are select for recording a coordinated presentation 304. For example, a user selects an option to cause camera 105 to record video and images of the user appear in the interface provided on a tablet user computing device 104. In addition, one or more options are provided for the one implementing special effect(s) on the recording (S110). For example, the image(s) of the user appear in the interface and an option is selected for green screen functionality. Continuing with this example, the user selects a background image of a newsroom that includes a conference room, and using gesture functionality the user sizes the image(s) to fit in context within the newsroom and places the image(s) of him to appear behind a desk in the newsroom. Various other effects can be provided in step S110, such as via effects module 262. For example, chroma key background removal for interactive video creation is provided, as are sound effects for interactive video creation. Moreover, themes can be provided for interactive video creation, including themes that are dynamically created based on meta data/user input.

Continuing with the example process S100 shown in FIG. 17, at step S112 options are provided for the user mix the recorded content (e.g., video) with content, for example, curated during step S106. The mixing process at step S112 can be implemented in various ways, including to include information formatted in XML and/or timestamps, which can result in content recorded in step S108 automatically pausing and some (or all) of the content curated in step S106 to be provided automatically. Alternatively, the mixing process can include functionality for a viewer of the coordinated presentation 304 to control when content recorded in step S108 is paused, which can result in corresponding content curated in step S106 to be provided automatically in response to the viewer pausing the playback, and further to result in the content recorded in step S108 to resume automatically upon completion of the content in step S106 and/or upon the user pausing or ending such (curated) content. Further, the mixing process in step S112 can be used to select a particular format for the coordinated presentation 304, such as to be compatible with a respective player. Moreover, resolution information can be obtained and used during playback of a coordinated presentation 304, and effected as a function of one or more calculations being performed, substantially in real-time.

Continuing with the example process S100 shown in FIG. 17, options are provided for distributing the coordinated presentation 304 (step S116). Thereafter, the process ends at step S118.

Thus, the present application provides significant flexibility and creativity in connection with creating and viewing coordinated presentations. Although many of the examples shown and described herein regard distribution of coordinated presentations to a plurality of users, the invention is not so limited. For example, private coordinated presentations may be distributed to a single party or a defined group of parties, such as within a single organization. Moreover, private coordinated presentations may be exchanged between two more parties, and thereafter modified or appended to resulting in revised coordinated presentations. In this way, a form of communication, such as e-mail, text or other type of threaded communication, is supported in accordance with the teachings herein. Content associated with coordinated presentations may be stored locally on a server that is operated and/or managed by a proprietor of the present application, and may be distributed over a plurality of computing devices.

Figure 18:
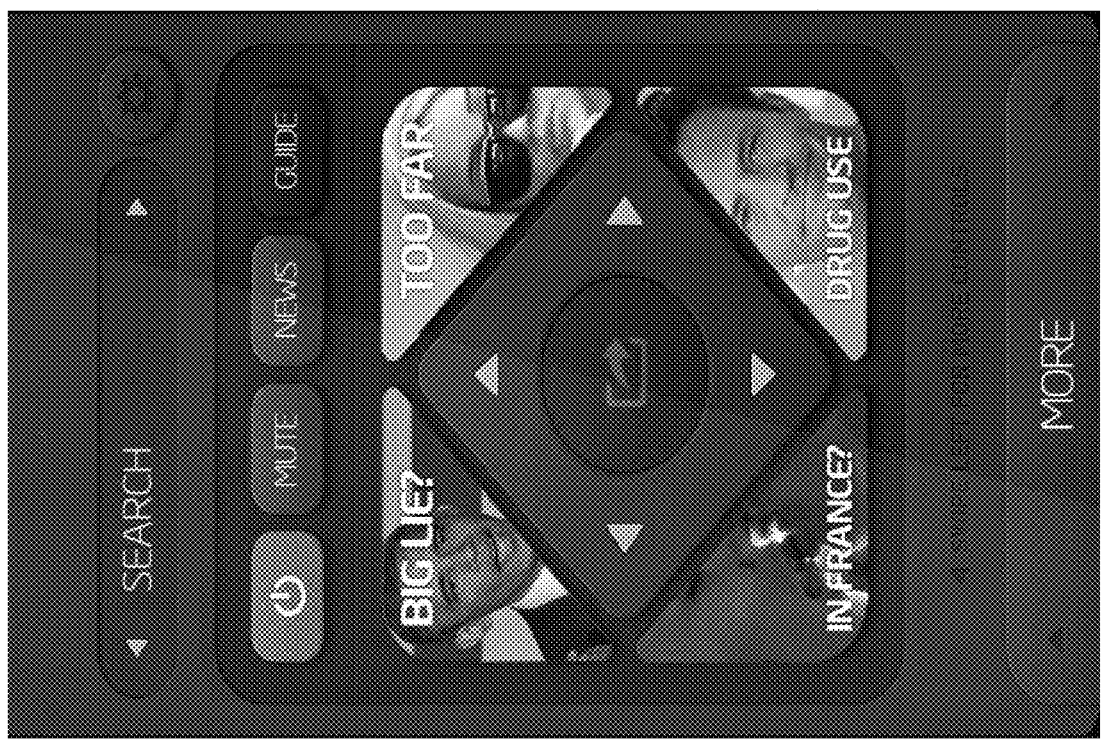
FIG. 18 illustrates an example remote control device that is usable to control one or more display devices, in accordance with an example implementation.

Moreover, although many of the examples and implementations shown and described herein relate to virtual operation, such as on a touchpad or gesture-based system, the present application is not so limited. FIG. 18 illustrates an example remote control device 1800 that is usable to control one or more display devices that may be configured to provide coordinated presentations, and for viewing and for creation, substantially as shown and described herein. The remote control may include or otherwise control a secondary display that can be synced with a primary display to bring the interactivity described herein, (e.g., vApps and/or traditional television controls) to the remote device. The remote device can take user input which then displays on the primary device (the vApp updated with user content) or controls the actions on the primary device (such as changing channels, or the like). For example, the poll on the primary display (inside a video feed) displays on the remote control device, and the viewer can vote on the remote, with the polling data updating in real-time on the primary display. A remote control can be provided for control over content being displayed or provided in a display, and can be configured as a foot pedal other interfaces Entries made as a function of one or more remote controls can include, for example, in response to a prompt for keyword, preloaded content relating to the keyword, to provide personalized content, for a customized background; to display Twitter feeds, to display particular web pages, to display Facebook updates or for other personalized optional parameters.

In one or more implementations, the present application provides an ability to run XML data received from a coordinated presentation. The XML may coordinate information running from servers for the vApps. In one or more implementations, an interactive box configured with an IP address and is able to communicate over the Internet associates the XML feed to a live broadcast feed coming from a traditional cable box. Accordingly, broadcasters may package their broadcast graphics feed with technology shown and described herein so that graphics for live or asynchronous cable or satellite television have the XML data. When the television feed reaches the box, the feed is synced with the XML so that traditional television is interactive.

Additional example functionality and features provided in accordance with the present application are provided below.

Figure 19:
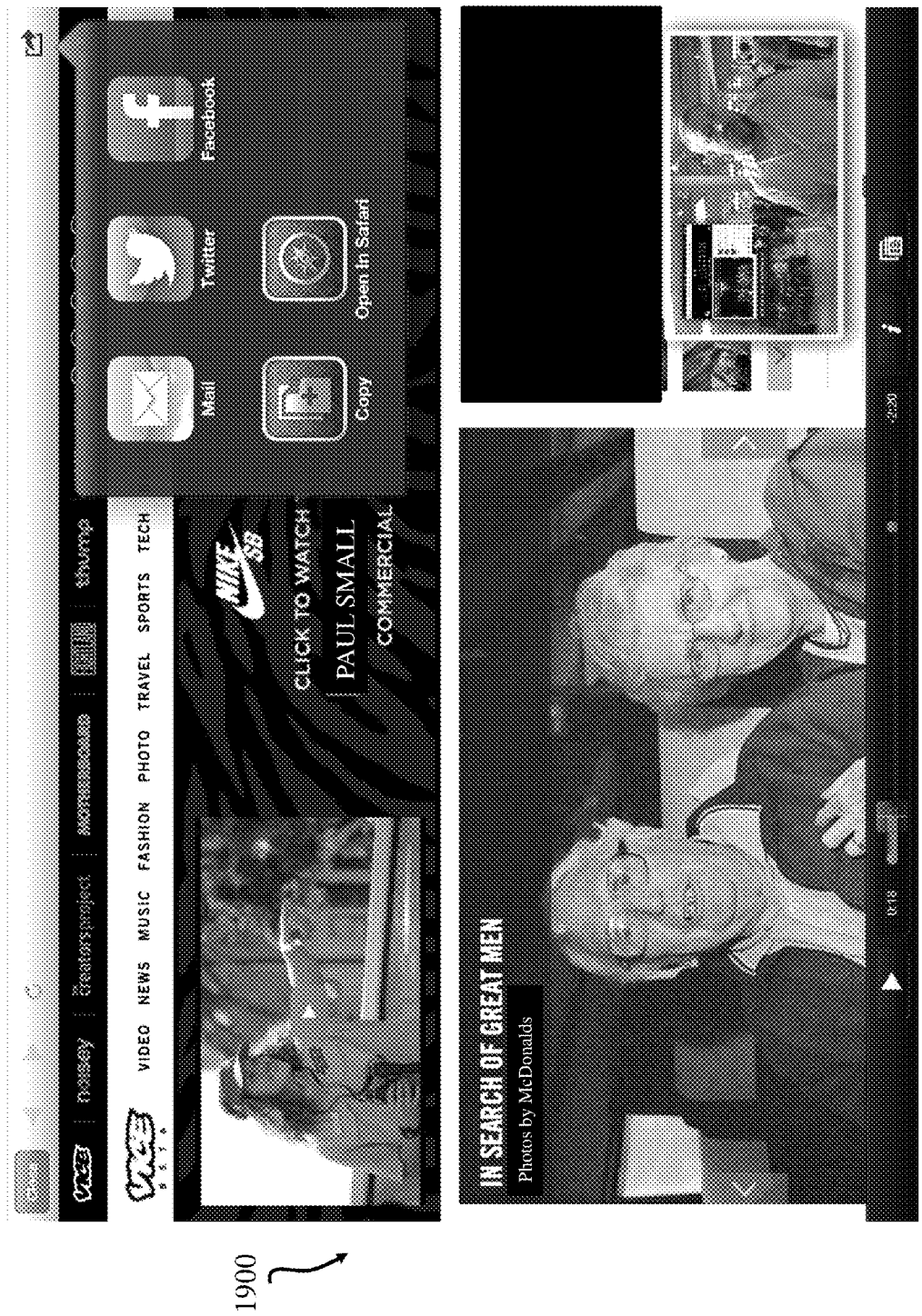
FIG. 19 illustrates an example display screen that includes a coordinated presentation that includes a plurality of HTTP sessions.

One or more HTTP sessions may be integrated and provided during of a coordinated presentation 304. Accordingly the present application is not limited to a single HTML instance. An example coordinated presentation 304 that includes a plurality of HTM sessions is shown in example display screen 1900, in FIG. 19.

Advertisement Module 266 can be included that is usable to interface with one or more hardware and software systems to provide advertisements in particular context and times. For example, an advertisement network can be provided and/or supported, which can pull content into a blog or other display to provide advertisements in a coordinated presentation display. Advertisements may be provided that relates to content being seen; For example, a story is being viewed regarding a first topic, thereafter the another story is provided that may relate to a different topic or that relates back to the first topic; An advertisement may be displayed that relate to first topic and/or the second topic.

Although illustrated embodiments of the present invention have been shown and described, it should be understood that various changes, substitutions, and alterations can be made by one of ordinary skill in the art without departing from the scope of the present invention.

What is claimed is:

1. A system for generating a coordinated presentation, comprising:
    a computing device having a processor and a memory, the computing device being configured by code stored in the memory and executed by the processor to generate the coordinated presentation;
    a curating content module comprising instructions executing so as to configure the processor to curate content selected by a user for inclusion in the coordinated presentation;
    an audio/visual input module comprising instructions executing so as to configure the processor to capture, at least via a camera, a plurality of images for inclusion in the coordinated presentation;
    a display module comprising instructions executing so as to configure the processor to display, via a display coupled to the computing device, a first arrangement of all of the curated content;
    a gesture-based user interface module including a touch-screen interface and comprising instructions executing so as to configure the processor to enable user-based selection and manipulation of a portion of the curated content and at least some of the plurality of images, wherein the portion is less than all of the curated content; and
    a video mixer module comprising instructions executing so as to configure the processor to integrate the plurality of images captured by the camera together with a portion of the curated content via a user selection from the touch-screen interface, and thereby to generate the coordinated presentation that is capable of transmission to and receipt by one or more remote devices; and wherein the coordinated presentation is configured to enable interaction with the portion of the curated content at each of the remote devices such that results of a respective interaction at a particular remote device are viewable at the particular remote device but are not viewable at (a) other of the remote devices and (b) the display.

2. The system of claim 1, wherein the video mixer module further comprises instructions executing so as to configure the processor to integrate the plurality of images captured by the camera together with a second portion of the curated content via a user selection from the touch-screen interface, wherein the first portion of the curated content and the second portion of the curated content are integrated for interaction at different times during playback of the coordinated presentation.

3. The system of claim 2, wherein the video mixer module further comprises instructions executing so as to configure the processor to identify the different times as a function of respective time codes associated with the plurality of images.

4. The system of claim 1, wherein the curating content module further comprises instructions executing so as to configure the processor to curate the content selected by the user as a function of at least one reference to the content.

5. The system of claim 4, wherein the at least one reference includes Extensible Markup Language information.

6. The system of claim 1, wherein the video mixer module further comprises instructions executing so as to configure the processor generate the coordinated presentation module to automatically:
    pause display of the plurality of images;
    provide at least some of the portion of the curated content; and
    resume display of the plurality of images substantially at the point of the pause after the one or more remote devices have completed interaction with the portion of the curated content.

7. The system of claim 1, wherein at least some of the content is accessible on a data communication network.

8. The system of claim 1, further comprising:
    a video application module comprising instructions executing so as to configure the processor to provide access to an application to be embedded in the coordinated presentation, wherein the coordinated presentation is configured to enable interaction with the application at at least one of the remote devices.

9. The system of claim 1, further comprising:
    a special effects module comprising instructions executing so as to configure the processor to provide chroma key background removal of at least some of the plurality of images and replace the removed background with at least some of the curated content.

10. The system of claim 9, wherein the special effects module further comprises instructions executing so as to configure the processor to adjust one or more of the size, orientation and position of the at least some of the plurality of images within the replaced background in response to a user selection.

11. A method for generating a coordinated presentation using a computing device having a processor and a memory, comprising:
    curating, by the processor, content selected by a user for inclusion in the coordinated presentation;
    capturing, by the processor at least via a camera, a plurality of images for inclusion in the coordinated presentation;
    displaying, by the processor via a display coupled to the computing device, a first arrangement of all of the curated content;
    enabling, by a gesture-based user interface including a touch-screen interface, user-based selection and manipulation of a portion of the curated content and at least some of the plurality of images, wherein the portion is less than all of the curated content;

integrating, by the processor, the plurality of images captured by the camera together with a portion of the curated content via a user selection from the touchscreen interface; and generating, by the processor, the coordinated presentation that is capable of transmission to and receipt by one or more remote devices, wherein the coordinated presentation is configured to enable interaction with the portion of the curated content at each of the remote devices such that results of a respective interaction at a particular remote device are viewable at the particular remote device but are not viewable at (a) other of the remote devices and (b) the display.

12. The method of claim 11, further comprising:
integrating, by the processor, the plurality of images captured by the camera together with a second portion of the curated content via a user selection from the touchscreen interface, wherein the first portion of the curated content and the second portion of the curated content are integrated for interaction at different times during the coordinated presentation.

13. The method of claim 12, further comprising:
identify, by the processor, the different times as a function of respective time codes associated with the plurality of images.

14. The method of claim 11, further comprising:
curating the content selected by the user as a function of at least one reference to the content.

15. The method of claim 14, wherein the at least one reference includes Extensible Markup Language information.

16. The method of claim 11, further comprising:
generating the coordinated presentation module to automatically:
pause display of the plurality of images;
provide at least some of the portion of the curated content; and
resume display of the plurality of images substantially at the point of the pause after the one or more remote devices have completed interaction with the portion of the curated content.

17. The method of claim 11, wherein at least some of the content is accessible on a data communication network.

18. The method of claim 11, further comprising:
providing access to an application to be embedded in the coordinated presentation, wherein the coordinated presentation is configured to enable interaction with the application at at least one of the remote devices.

19. The method of claim 11, further comprising:
providing, by the processor, chroma key background removal of at least some of the plurality of images and replace the removed background with at least some of the curated content.

20. The method of claim 19, further comprising:
adjusting one or more of the size, orientation and position of the at least some of the plurality of images within the replaced background in response to a user selection.

* * * * *